US010183416B2

(12) United States Patent
Hand et al.

(10) Patent No.: US 10,183,416 B2
(45) Date of Patent: Jan. 22, 2019

(54) WOOD BOARD AND PROCESS FOR ITS PRODUCTION

(71) Applicants: KNAUF INSULATION SPRL, Vise (BE); KNAUF INSULATION, INC., Shelbyville, IN (US)

(72) Inventors: Richard Hand, St. Helens (GB); Roger Jackson, St. Helens (GB)

(73) Assignees: Knauf Insulation, Inc., Shelbyville, IN (US); Knauf Insulation SPRL, Vise (BE)

(*) Notice: Subject to any disclaimer, the term of this patent is extended or adjusted under 35 U.S.C. 154(b) by 0 days.

(21) Appl. No.: 15/333,670

(22) Filed: Oct. 25, 2016

(65) Prior Publication Data
US 2017/0106561 A1    Apr. 20, 2017

Related U.S. Application Data

(63) Continuation of application No. 14/422,104, filed as application No. PCT/EP2013/067204 on Aug. 17, 2013, now Pat. No. 9,492,943.

(30) Foreign Application Priority Data

Aug. 17, 2012  (GB) .................................. 1214734.4

(51) Int. Cl.
| B27N 1/00 | (2006.01) |
| B27N 1/02 | (2006.01) |
| B27N 3/00 | (2006.01) |
| B27N 3/08 | (2006.01) |
| B27N 7/00 | (2006.01) |
| C08L 97/02 | (2006.01) |
| B27N 3/02 | (2006.01) |
| B27N 3/18 | (2006.01) |

(52) U.S. Cl.
CPC ............ *B27N 7/00* (2013.01); *B27N 1/0209* (2013.01); *B27N 3/00* (2013.01); *B27N 3/002* (2013.01); *B27N 3/02* (2013.01); *B27N 3/08* (2013.01); *B27N 3/18* (2013.01); *C08L 97/02* (2013.01); *Y10T 428/31975* (2015.04)

(58) Field of Classification Search
None
See application file for complete search history.

(56) References Cited

U.S. PATENT DOCUMENTS

| 1,801,052 A | 4/1931 | Meigs |
| 1,801,053 A | 4/1931 | Meigs |
| 1,886,353 A | 11/1932 | Novotny |
| 1,902,948 A | 3/1933 | Castle |
| 1,964,263 A | 6/1934 | Krenke |
| 2,198,874 A | 4/1940 | Leighton |
| 2,215,825 A | 9/1940 | Wallace |
| 2,261,295 A | 11/1941 | Schlack |
| 2,362,086 A | 11/1944 | Eastes |
| 2,371,990 A | 3/1945 | Hanford |
| 2,392,105 A | 1/1946 | Sussman |
| 2,442,989 A | 6/1948 | Sussman |
| 2,500,665 A | 3/1950 | Courtright |
| 2,518,956 A | 8/1950 | Sussman |
| 2,875,073 A | 2/1959 | Gogek |
| 2,894,920 A | 7/1959 | Ramos |
| 2,965,504 A | 12/1960 | Gogek |
| 3,038,462 A | 6/1962 | Bohdan |
| 3,138,473 A | 6/1964 | Floyd |
| 3,222,243 A | 12/1965 | Gaston |
| 3,231,349 A | 1/1966 | Stalego |
| 3,232,821 A | 2/1966 | Banks |
| 3,297,419 A | 1/1967 | Eyre |
| 3,513,001 A | 5/1970 | Woodhead |
| 3,551,365 A | 12/1970 | Matalon |
| 3,784,408 A | 1/1974 | Jaffe |
| 3,791,807 A | 2/1974 | Etzel |
| 3,802,897 A | 4/1974 | Voigt |
| 3,809,664 A | 5/1974 | Burr |
| 3,826,767 A | 7/1974 | Hoover |
| 3,856,606 A | 12/1974 | Fan |
| 3,867,119 A | 2/1975 | Takeo |
| 3,907,724 A | 9/1975 | Higginbottom |
| 3,911,048 A | 10/1975 | Vargiu |
| 3,919,134 A | 11/1975 | Higginbottom |
| 3,922,466 A | 11/1975 | Bell |
| 3,955,031 A | 5/1976 | Jones |
| 3,956,204 A | 5/1976 | Higginbottom |
| 3,961,081 A | 6/1976 | McKenzie |
| 3,971,807 A | 7/1976 | Brack |

(Continued)

FOREIGN PATENT DOCUMENTS

| AU | 8538765 | 8/1985 |
| AU | 9640921 | 7/1997 |

(Continued)

OTHER PUBLICATIONS

International Search Report and Written Opinion for PCT/US2008/059730, completed Sep. 22, 2008.
International Search Report and Written Opinion for PCT/US2008/069046, completed Sep. 25, 2008.
International Search Report for PCT/EP2008/060185, completed Oct. 23, 2008.
International Search Report for PCT/EP2011/057363, completed Sep. 5, 2011.
Ames, J.M., "The Maillard Browning Reaction—an Update," Chemistry & Industry, No. 17, 1988, 4 pages.
"Gamma-aminopropyltrimethoxysilane,"Hawley's Condensed Chemical Dictionary, 14th Edition, John Wiley & Sons, Inc., 2002, 1 page.
Hodge, J.E., Chemistry of Browning Reactions in Model Systems, 1953, J. Agric. Food Chem., vol. 1, No. 15, pp. 928-943.

(Continued)

Primary Examiner — Mary Lynn F Theisen
(74) Attorney, Agent, or Firm — Knauf Insulation, Inc.; James K. Blodgett

(57) ABSTRACT

The present application relates to wood boards, particularly post-cured wood boards and more particularly to particle board with excellent swelling properties; it also relates to a process for production of such boards.

26 Claims, 7 Drawing Sheets

(56) References Cited

U.S. PATENT DOCUMENTS

| | | |
|---|---|---|
| 4,014,726 A | 3/1977 | Fargo |
| 4,028,290 A | 6/1977 | Reid |
| 4,048,127 A | 9/1977 | Gibbons et al. |
| 4,054,713 A | 10/1977 | Sakaguchi |
| 4,085,076 A | 4/1978 | Gibbons et al. |
| 4,097,427 A | 6/1978 | Aitken |
| 4,107,379 A | 8/1978 | Stofko |
| 4,109,057 A | 8/1978 | Nakamura |
| 4,144,027 A | 3/1979 | Habib |
| 4,148,765 A | 4/1979 | Nelson |
| 4,183,997 A | 1/1980 | Stofko |
| 4,184,986 A | 1/1980 | Krasnobajew |
| 4,186,053 A | 1/1980 | Krasnobajew |
| 4,201,247 A | 5/1980 | Shannon |
| 4,201,857 A | 5/1980 | Krasnobajew |
| 4,217,414 A | 8/1980 | Walon |
| 4,233,432 A | 11/1980 | Curtis, Jr. |
| 4,246,367 A | 1/1981 | Curtis, Jr. |
| 4,259,190 A | 3/1981 | Fahey |
| 4,265,963 A | 5/1981 | Matalon |
| 4,278,573 A | 7/1981 | Tessler |
| 4,296,173 A | 10/1981 | Fahey |
| 4,301,310 A | 11/1981 | Wagner |
| 4,310,585 A | 1/1982 | Shannon |
| 4,322,523 A | 3/1982 | Wagner |
| 4,330,443 A | 5/1982 | Rankin |
| 4,333,484 A | 6/1982 | Keritsis |
| 4,357,194 A | 11/1982 | Stofko |
| 4,361,588 A | 11/1982 | Herz |
| 4,379,101 A | 4/1983 | Smith |
| 4,393,019 A | 7/1983 | Geimer |
| 4,396,430 A | 8/1983 | Matalon |
| 4,400,496 A | 8/1983 | Butler, Jr. |
| 4,464,523 A | 8/1984 | Neigel |
| 4,506,684 A | 3/1985 | Keritsis |
| 4,520,143 A | 5/1985 | Jellinek |
| 4,524,164 A | 6/1985 | Viswanathan et al. |
| 4,631,226 A | 12/1986 | Jellinek |
| 4,654,259 A | 3/1987 | Stofko |
| 4,668,716 A | 5/1987 | Pepe et al. |
| 4,692,478 A | 9/1987 | Viswanathan |
| 4,714,727 A | 12/1987 | Hume, III |
| 4,720,295 A | 1/1988 | Bronshtein |
| 4,754,056 A | 6/1988 | Ansel et al. |
| 4,761,184 A | 8/1988 | Markessini |
| 4,780,339 A | 10/1988 | Lacourse |
| 4,828,643 A | 5/1989 | Newman |
| 4,845,162 A | 7/1989 | Schmitt |
| 4,906,237 A | 3/1990 | Johansson |
| 4,912,147 A | 3/1990 | Pfoehler |
| 4,918,861 A | 4/1990 | Carpenter et al. |
| 4,923,980 A | 5/1990 | Blomberg |
| 4,950,444 A | 8/1990 | Deboufie |
| 4,988,780 A | 1/1991 | Das |
| 4,992,519 A | 2/1991 | Mukherjee |
| 5,001,202 A | 3/1991 | Denis et al. |
| 5,013,405 A | 5/1991 | Izard |
| 5,037,930 A | 8/1991 | Shih |
| 5,041,595 A | 8/1991 | Yang |
| 5,089,342 A | 2/1992 | Dhein |
| 5,095,054 A | 3/1992 | Lay |
| 5,106,615 A | 4/1992 | Dikstein |
| 5,114,004 A | 5/1992 | Isono |
| 5,123,949 A | 6/1992 | Thiessen |
| 5,124,369 A | 6/1992 | Vandichel |
| 5,128,407 A | 7/1992 | Layton |
| 5,143,582 A | 9/1992 | Arkens et al. |
| 5,151,465 A | 9/1992 | Le-Khac |
| 5,167,738 A | 12/1992 | Bichot |
| 5,198,492 A | 3/1993 | Stack |
| 5,217,741 A | 6/1993 | Kawachi et al. |
| 5,218,048 A | 6/1993 | Abe et al. |
| 5,240,498 A | 8/1993 | Matalon |
| 5,278,222 A | 1/1994 | Stack |
| 5,300,144 A | 4/1994 | Adams |
| 5,300,192 A | 4/1994 | Hansen, Sr. |
| 5,308,896 A | 5/1994 | Hansen, Sr. |
| 5,318,990 A | 6/1994 | Strauss |
| 5,336,753 A | 8/1994 | Jung |
| 5,336,755 A | 8/1994 | Pape |
| 5,336,766 A | 8/1994 | Koga et al. |
| 5,340,868 A | 8/1994 | Strauss et al. |
| 5,352,480 A | 10/1994 | Hansen, Sr. |
| 5,371,194 A | 12/1994 | Ferretti |
| 5,387,665 A | 2/1995 | Misawa |
| 5,389,716 A | 2/1995 | Graves |
| 5,393,849 A | 2/1995 | Srinivasan |
| 5,416,139 A | 5/1995 | Zeiszler |
| 5,421,838 A | 6/1995 | Gosset |
| 5,424,418 A | 6/1995 | Duflot |
| 5,434,233 A | 7/1995 | Kiely |
| 5,447,977 A | 9/1995 | Hansen, Sr. |
| 5,470,843 A | 11/1995 | Stahl |
| 5,480,973 A | 1/1996 | Goodlad |
| 5,492,756 A | 2/1996 | Seale, Jr. |
| 5,498,662 A | 3/1996 | Tanaka |
| 5,503,920 A | 4/1996 | Alkire et al. |
| 5,534,612 A | 7/1996 | Taylor |
| 5,536,766 A | 7/1996 | Seyffer |
| 5,538,783 A | 7/1996 | Hansen et al. |
| 5,543,215 A | 8/1996 | Hansen et al. |
| 5,545,279 A | 8/1996 | Hall |
| 5,547,541 A | 8/1996 | Hansen et al. |
| 5,547,745 A | 8/1996 | Hansen et al. |
| 5,550,189 A | 8/1996 | Qin |
| 5,554,730 A | 9/1996 | Woiszwillo |
| 5,562,740 A | 10/1996 | Cook |
| 5,571,618 A | 11/1996 | Hansen, Sr. |
| 5,578,678 A | 11/1996 | Hartmann |
| 5,580,856 A | 12/1996 | Prestrelski |
| 5,582,682 A | 12/1996 | Ferretti |
| 5,583,193 A | 12/1996 | Aravindakshan |
| 5,589,256 A | 12/1996 | Hansen, Sr. |
| 5,589,536 A | 12/1996 | Golino |
| 5,607,759 A | 3/1997 | Hansen, Sr. |
| 5,608,011 A | 3/1997 | Eck |
| 5,609,727 A | 3/1997 | Hansen, Sr. |
| 5,614,570 A | 3/1997 | Hansen, Sr. |
| 5,620,940 A | 4/1997 | Birbara |
| 5,621,026 A | 4/1997 | Tanaka |
| 5,633,298 A | 5/1997 | Arfaei |
| 5,641,561 A | 6/1997 | Hansen |
| 5,643,978 A | 7/1997 | Darwin |
| 5,645,756 A | 7/1997 | Dubin |
| 5,660,904 A | 8/1997 | Andersen et al. |
| 5,661,213 A | 8/1997 | Arkens |
| 5,670,585 A | 9/1997 | Taylor |
| 5,672,418 A | 9/1997 | Hansen |
| 5,672,659 A | 9/1997 | Shalaby |
| 5,690,715 A | 11/1997 | Schiwek |
| 5,691,060 A | 11/1997 | Levy |
| 5,693,411 A | 12/1997 | Hansen, Sr. |
| 5,719,092 A | 2/1998 | Arrington |
| 5,719,228 A | 2/1998 | Taylor |
| 5,756,580 A | 5/1998 | Natori |
| 5,763,524 A | 6/1998 | Arkens |
| 5,788,243 A | 8/1998 | Harshaw et al. |
| 5,788,423 A | 8/1998 | Perkins |
| 5,807,364 A | 9/1998 | Hansen |
| 5,855,987 A | 1/1999 | Margel |
| 5,863,985 A | 1/1999 | Shalaby |
| 5,885,337 A | 3/1999 | Nohr |
| 5,895,804 A | 4/1999 | Lee, Sr. |
| 5,905,115 A | 5/1999 | Luitjes |
| 5,916,503 A | 6/1999 | Rettenbacher |
| 5,919,528 A | 7/1999 | Huijs |
| 5,919,831 A | 7/1999 | Philipp |
| 5,922,403 A | 7/1999 | Tecle |
| 5,925,722 A | 7/1999 | Exner et al. |
| 5,929,184 A | 7/1999 | Holmes-Farley et al. |
| 5,929,196 A | 7/1999 | Kissel et al. |
| 5,932,344 A | 8/1999 | Ikemoto |
| 5,932,665 A | 8/1999 | Deporter et al. |
| 5,932,689 A | 8/1999 | Arkens |

(56) References Cited

U.S. PATENT DOCUMENTS

| | | |
|---|---|---|
| 5,942,123 A | 8/1999 | McArdle |
| 5,954,869 A | 9/1999 | Elfersy et al. |
| 5,977,224 A | 11/1999 | Cheung |
| 5,977,232 A | 11/1999 | Arkens |
| 5,981,719 A | 11/1999 | Woiszwillo |
| 5,983,586 A | 11/1999 | Berdan, II et al. |
| 5,990,216 A | 11/1999 | Cai |
| 5,993,709 A | 11/1999 | Bonomo |
| 6,022,615 A | 2/2000 | Rettenbacher |
| 6,067,821 A | 5/2000 | Jackson |
| 6,071,549 A | 6/2000 | Hansen |
| 6,071,994 A | 6/2000 | Hummerich |
| 6,072,086 A | 6/2000 | James et al. |
| 6,077,883 A | 6/2000 | Taylor |
| 6,090,925 A | 7/2000 | Woiszwillo |
| 6,114,033 A | 9/2000 | Ikemoto |
| 6,114,464 A | 9/2000 | Reck |
| 6,133,347 A | 10/2000 | Vickers, Jr. |
| 6,136,916 A | 10/2000 | Arkens |
| 6,139,619 A | 10/2000 | Zaretskiy |
| 6,143,243 A | 11/2000 | Gershun |
| 6,171,444 B1 | 1/2001 | Nigam |
| 6,171,654 B1 | 1/2001 | Salsman |
| 6,180,037 B1 | 1/2001 | Anderson |
| 6,194,512 B1 | 2/2001 | Chen |
| 6,210,472 B1 | 4/2001 | Kwan |
| 6,221,958 B1 | 4/2001 | Shalaby |
| 6,221,973 B1 | 4/2001 | Arkens |
| 6,231,721 B1 | 5/2001 | Quick, Sr. |
| 6,274,661 B1 | 8/2001 | Chen |
| 6,281,298 B1 | 8/2001 | Papsin, Jr. |
| 6,299,677 B1 | 10/2001 | Johnson |
| 6,299,936 B1 | 10/2001 | Reck |
| 6,307,732 B1 | 10/2001 | Tsubaki |
| 6,310,227 B1 | 10/2001 | Sarama |
| 6,313,102 B1 | 11/2001 | Colaco et al. |
| 6,319,683 B1 | 11/2001 | James et al. |
| 6,331,350 B1 | 12/2001 | Taylor |
| 6,331,513 B1 | 12/2001 | Zaid |
| 6,340,411 B1 | 1/2002 | Hansen |
| 6,348,530 B1 | 2/2002 | Reck |
| 6,365,079 B1 | 4/2002 | Winkler |
| 6,372,077 B1 | 4/2002 | Tecle |
| 6,379,739 B1 | 4/2002 | Formanek |
| 6,395,856 B1 | 5/2002 | Petty |
| 6,403,665 B1 | 6/2002 | Sieker |
| 6,407,225 B1 | 6/2002 | Mang et al. |
| 6,410,036 B1 | 6/2002 | De Rosa |
| 6,440,204 B1 | 8/2002 | Rogols |
| 6,461,553 B1 | 10/2002 | Hansen, Sr. |
| 6,468,442 B2 | 10/2002 | Bytnar |
| 6,468,730 B2 | 10/2002 | Fujiwara |
| 6,469,120 B1 | 10/2002 | Elfersy |
| 6,475,552 B1 | 11/2002 | Shah |
| 6,482,875 B2 | 11/2002 | Lorenz |
| 6,495,656 B1 | 12/2002 | Haile |
| 6,521,339 B1 | 2/2003 | Hansen, Sr. |
| 6,525,009 B2 | 2/2003 | Sachdev |
| 6,538,057 B1 | 3/2003 | Wildburg |
| 6,547,867 B2 | 4/2003 | Rogols |
| 6,555,616 B1 | 4/2003 | Helbing et al. |
| 6,559,302 B1 | 5/2003 | Shah |
| 6,562,267 B1 | 5/2003 | Hansen |
| 6,596,103 B1 | 7/2003 | Hansen |
| 6,613,378 B1 | 9/2003 | Erhan |
| 6,638,882 B1 | 10/2003 | Helbing |
| 6,638,884 B2 | 10/2003 | Quick |
| 6,699,945 B1 | 3/2004 | Chen |
| 6,706,853 B1 | 3/2004 | Stanssens et al. |
| 6,719,862 B2 | 4/2004 | Quick, Sr. |
| 6,730,730 B1 | 5/2004 | Hansen |
| 6,753,361 B2 | 6/2004 | Kroner |
| 6,818,694 B2 | 11/2004 | Hindi |
| 6,821,547 B2 | 11/2004 | Shah |
| 6,852,247 B2 | 2/2005 | Bytnar |
| 6,858,074 B2 | 2/2005 | Anderson |
| 6,861,495 B2 | 3/2005 | Barsotti |
| 6,864,044 B2 | 3/2005 | Ishikawa |
| 6,878,800 B2 | 4/2005 | Husemoen |
| 6,884,849 B2 | 4/2005 | Chen |
| 6,955,844 B2 | 10/2005 | Tagge |
| 6,962,714 B2 | 11/2005 | Hei |
| 6,989,171 B2 | 1/2006 | Portman |
| 6,992,203 B2 | 1/2006 | Trusovs |
| 7,018,490 B2 | 3/2006 | Hansen |
| 7,029,717 B1 | 4/2006 | Ojima |
| 7,067,579 B2 | 6/2006 | Taylor |
| 7,083,831 B1 | 8/2006 | Koch |
| 7,090,745 B2 | 8/2006 | Beckman |
| 7,141,626 B2 | 11/2006 | Rodrigues |
| 7,144,474 B1 | 12/2006 | Hansen et al. |
| 7,195,792 B2 | 3/2007 | Boston |
| 7,201,778 B2 | 4/2007 | Smith |
| 7,201,825 B2 | 4/2007 | Dezutter |
| 7,202,326 B2 | 4/2007 | Kuroda |
| 7,241,487 B2 | 7/2007 | Taylor |
| 7,458,235 B2 | 12/2008 | Beaufils |
| 7,514,027 B2 | 4/2009 | Horres |
| 7,655,711 B2 | 2/2010 | Swift |
| 7,772,347 B2 | 8/2010 | Swift |
| 7,795,354 B2 | 9/2010 | Srinivasan et al. |
| 7,803,879 B2 | 9/2010 | Srinivasan et al. |
| 7,807,771 B2 | 10/2010 | Swift |
| 7,842,382 B2 | 11/2010 | Helbing |
| 7,854,980 B2 | 12/2010 | Jackson et al. |
| 7,883,693 B2 | 2/2011 | Sehl |
| 7,888,445 B2 | 2/2011 | Swift |
| 7,947,765 B2 | 5/2011 | Swift |
| 8,114,210 B2 | 2/2012 | Hampson |
| 8,182,648 B2 | 5/2012 | Swift |
| 8,211,923 B2 | 7/2012 | Wagner |
| 8,372,900 B2 | 2/2013 | Shooshtari |
| 8,377,564 B2 | 2/2013 | Shooshtari |
| 8,501,838 B2 | 8/2013 | Jackson et al. |
| 8,680,224 B2 | 3/2014 | Zhang |
| 8,691,934 B2 | 4/2014 | Helbing |
| 8,900,495 B2 | 12/2014 | Pacorel |
| 9,492,943 B2 * | 11/2016 | Hand ............... B27N 3/00 |
| 2001/0017427 A1 | 8/2001 | Rosthauser |
| 2001/0046824 A1 | 11/2001 | Nigam |
| 2002/0000100 A1 | 1/2002 | Burg |
| 2002/0025435 A1 | 2/2002 | Hansen, Sr. |
| 2002/0026025 A1 | 2/2002 | Kuo |
| 2002/0028857 A1 | 3/2002 | Holy |
| 2002/0032253 A1 | 3/2002 | Lorenz |
| 2002/0042473 A1 | 4/2002 | Trollsas |
| 2002/0091185 A1 | 7/2002 | Taylor |
| 2002/0096278 A1 | 7/2002 | Foster |
| 2002/0123598 A1 | 9/2002 | Sieker |
| 2002/0130439 A1 | 9/2002 | Kroner |
| 2002/0161108 A1 | 10/2002 | Schultz |
| 2002/0197352 A1 | 12/2002 | Portman |
| 2003/0005857 A1 | 1/2003 | Minami |
| 2003/0040239 A1 | 2/2003 | Toas |
| 2003/0044513 A1 | 3/2003 | Shah |
| 2003/0066523 A1 | 4/2003 | Lewis |
| 2003/0071879 A1 | 4/2003 | Swenson |
| 2003/0116294 A1 | 6/2003 | Kehrer |
| 2003/0134945 A1 | 7/2003 | Capps |
| 2003/0148084 A1 | 8/2003 | Trocino |
| 2003/0153690 A1 | 8/2003 | Husemoen |
| 2003/0185991 A1 | 10/2003 | Wigger |
| 2003/0203117 A1 | 10/2003 | Bartkowiak |
| 2004/0002567 A1 | 1/2004 | Chen |
| 2004/0019168 A1 | 1/2004 | Soerens |
| 2004/0024170 A1 | 2/2004 | Husemoen |
| 2004/0033269 A1 | 2/2004 | Hei |
| 2004/0033747 A1 | 2/2004 | Miller |
| 2004/0034154 A1 | 2/2004 | Tutin |
| 2004/0038017 A1 | 2/2004 | Tutin |
| 2004/0048531 A1 | 3/2004 | Belmares |
| 2004/0077055 A1 | 4/2004 | Fosdick |
| 2004/0079499 A1 | 4/2004 | Dezutter |
| 2004/0087024 A1 | 5/2004 | Bellocq |

(56) References Cited

U.S. PATENT DOCUMENTS

| | | |
|---|---|---|
| 2004/0087719 A1 | 5/2004 | Rautschek |
| 2004/0122166 A1 | 6/2004 | O'Brien-Bernini |
| 2004/0131874 A1 | 7/2004 | Tutin |
| 2004/0144706 A1 | 7/2004 | Beaufils |
| 2004/0152824 A1 | 8/2004 | Dobrowolski |
| 2004/0161993 A1 | 8/2004 | Tripp |
| 2004/0209851 A1 | 10/2004 | Nelson |
| 2004/0213930 A1 | 10/2004 | Halabisky |
| 2004/0220368 A1 | 11/2004 | Li |
| 2004/0249066 A1 | 12/2004 | Heinzman |
| 2004/0254285 A1 | 12/2004 | Rodrigues |
| 2004/0260082 A1 | 12/2004 | Van Der Wilden |
| 2005/0001198 A1 | 1/2005 | Bytnar |
| 2005/0017394 A1 | 1/2005 | Hochsmann |
| 2005/0027283 A1 | 2/2005 | Richard |
| 2005/0033037 A1 | 2/2005 | Trusovs |
| 2005/0048212 A1 | 3/2005 | Clamen |
| 2005/0059770 A1 | 3/2005 | Srinivasan |
| 2005/0171085 A1 | 8/2005 | Pinto |
| 2005/0196421 A1 | 9/2005 | Hunter |
| 2005/0202224 A1 | 9/2005 | Helbing |
| 2005/0208852 A1 | 9/2005 | Weber |
| 2005/0215153 A1 | 9/2005 | Cossement |
| 2005/0245669 A1 | 11/2005 | Clungeon |
| 2005/0275133 A1 | 12/2005 | Cabell |
| 2005/0288479 A1 | 12/2005 | Kuroda |
| 2006/0005580 A1 | 1/2006 | Espiard |
| 2006/0044302 A1 | 3/2006 | Chen |
| 2006/0099870 A1 | 5/2006 | Garcia |
| 2006/0111480 A1 | 5/2006 | Hansen |
| 2006/0124538 A1 | 6/2006 | Morcrette |
| 2006/0135433 A1 | 6/2006 | Murray |
| 2006/0141177 A1 | 6/2006 | Ligtenberg |
| 2006/0179892 A1 | 8/2006 | Horres |
| 2006/0188465 A1 | 8/2006 | Perrier |
| 2006/0198954 A1 | 9/2006 | Frechem |
| 2006/0231487 A1 | 10/2006 | Bartley |
| 2006/0252855 A1 | 11/2006 | Pisanova |
| 2006/0281622 A1 | 12/2006 | Maricourt |
| 2007/0006390 A1 | 1/2007 | Clamen |
| 2007/0009582 A1 | 1/2007 | Madsen |
| 2007/0027281 A1 | 2/2007 | Michl |
| 2007/0039520 A1 | 2/2007 | Crews |
| 2007/0082983 A1 | 4/2007 | Crews et al. |
| 2007/0123679 A1 | 5/2007 | Swift |
| 2007/0123680 A1 | 5/2007 | Swift |
| 2007/0129522 A1 | 6/2007 | Burckhardt et al. |
| 2007/0142596 A1 | 6/2007 | Swift |
| 2007/0158022 A1 | 7/2007 | Heep |
| 2007/0184740 A1 | 8/2007 | Keller |
| 2007/0191574 A1 | 8/2007 | Miller |
| 2007/0270070 A1 | 11/2007 | Othman |
| 2007/0287018 A1 | 12/2007 | Tutin |
| 2007/0292618 A1 | 12/2007 | Srinivasan et al. |
| 2007/0292619 A1 | 12/2007 | Srinivasan et al. |
| 2007/0298274 A1 | 12/2007 | Eriksson |
| 2008/0009209 A1 | 1/2008 | Clamen |
| 2008/0009616 A1 | 1/2008 | Frank |
| 2008/0051539 A1 | 2/2008 | Kelly |
| 2008/0060551 A1 | 3/2008 | Crews |
| 2008/0081138 A1 | 4/2008 | Moore |
| 2008/0108741 A1 | 5/2008 | Van Herwijnen |
| 2008/0160260 A1 | 7/2008 | Wada |
| 2008/0160302 A1 | 7/2008 | Asrar |
| 2008/0194738 A1 | 8/2008 | Crews |
| 2009/0169867 A1 | 7/2009 | Kelly |
| 2009/0170978 A1 | 7/2009 | Kelly |
| 2009/0227732 A1 | 9/2009 | Glockner |
| 2009/0301972 A1 | 12/2009 | Hines |
| 2009/0304919 A1 | 12/2009 | Wagner |
| 2009/0306255 A1 | 12/2009 | Patel |
| 2009/0324915 A1 | 12/2009 | Swift |
| 2010/0029160 A1 | 2/2010 | Srinivasan |
| 2010/0058661 A1 | 3/2010 | Jackson |
| 2010/0080976 A1 | 4/2010 | Jackson |
| 2010/0084598 A1 | 4/2010 | Jackson |
| 2010/0086726 A1 | 4/2010 | Jackson |
| 2010/0087571 A1 | 4/2010 | Jackson |
| 2010/0098947 A1 | 4/2010 | Inoue |
| 2010/0117023 A1 | 5/2010 | Dopico |
| 2010/0129640 A1 | 5/2010 | Kelly |
| 2010/0130649 A1 | 5/2010 | Swift |
| 2010/0175826 A1 | 7/2010 | Huenig |
| 2010/0210595 A1 | 8/2010 | Wagner |
| 2010/0222463 A1 | 9/2010 | Brady |
| 2010/0222566 A1 | 9/2010 | Fosdick |
| 2010/0282996 A1 | 11/2010 | Jaffrennou |
| 2010/0301256 A1 | 12/2010 | Hampson |
| 2010/0320113 A1 | 12/2010 | Swift |
| 2011/0021672 A1 | 1/2011 | Crews |
| 2011/0039111 A1 | 2/2011 | Shooshtari |
| 2011/0040010 A1 | 2/2011 | Shooshtari |
| 2011/0042303 A1 | 2/2011 | Shooshtari |
| 2011/0045966 A1 | 2/2011 | Shooshtari |
| 2011/0089074 A1 | 4/2011 | Jackson |
| 2011/0135937 A1 | 6/2011 | Swift |
| 2011/0190425 A1 | 8/2011 | Swift |
| 2011/0220835 A1 | 9/2011 | Swift |
| 2011/0256790 A1 | 10/2011 | Toas |
| 2011/0260094 A1 | 10/2011 | Hampson |
| 2011/0262648 A1 | 10/2011 | Lee |
| 2011/0263757 A1 | 10/2011 | Rand |
| 2011/0306726 A1 | 12/2011 | Bailey |
| 2012/0133073 A1 | 5/2012 | Pacorel |
| 2012/0156954 A1 | 6/2012 | Eckert |
| 2013/0029150 A1 | 1/2013 | Appley |
| 2013/0032749 A1 | 2/2013 | Jaffrennou |
| 2013/0047888 A1 | 2/2013 | Mueller |
| 2013/0059075 A1 | 3/2013 | Appley |
| 2013/0082205 A1 | 4/2013 | Mueller |
| 2013/0174758 A1 | 7/2013 | Mueller |
| 2013/0234362 A1 | 9/2013 | Swift |
| 2013/0236650 A1 | 9/2013 | Swift |
| 2013/0237113 A1 | 9/2013 | Swift |
| 2013/0244524 A1 | 9/2013 | Swift |
| 2014/0091247 A1 | 4/2014 | Jackson |
| 2014/0134909 A1 | 5/2014 | Guo |
| 2014/0357787 A1 | 12/2014 | Jobber |

FOREIGN PATENT DOCUMENTS

| | | |
|---|---|---|
| CA | 1090026 | 11/1980 |
| CA | 2037214 | 9/1991 |
| CA | 2232334 | 11/1998 |
| CA | 2458333 | 12/1999 |
| CA | 2278946 | 1/2000 |
| CA | 2470783 | 12/2004 |
| CN | 1251738 | 5/2000 |
| DE | 1905054 | 8/1969 |
| DE | 4142261 | 6/1993 |
| DE | 4233622 | 4/1994 |
| DE | 4308089 | 9/1994 |
| DE | 102004033561 | 9/2005 |
| DE | 102005023431 | 11/2006 |
| EP | 0044614 A2 | 1/1982 |
| EP | 0099801 | 2/1984 |
| EP | 354023 | 2/1990 |
| EP | 0461995 | 12/1991 |
| EP | 0524518 A2 | 1/1993 |
| EP | 0547819 A2 | 6/1993 |
| EP | 0583086 A1 | 2/1994 |
| EP | 0714754 A2 | 6/1996 |
| EP | 796681 | 9/1997 |
| EP | 0826710 A2 | 3/1998 |
| EP | 856494 | 8/1998 |
| EP | 0873976 A1 | 10/1998 |
| EP | 878135 | 11/1998 |
| EP | 0882756 A2 | 12/1998 |
| EP | 0911361 A1 | 4/1999 |
| EP | 915811 | 5/1999 |
| EP | 936060 | 8/1999 |
| EP | 976866 | 2/2000 |
| EP | 0990729 A1 | 4/2000 |
| EP | 1038433 A1 | 9/2000 |

(56) References Cited

FOREIGN PATENT DOCUMENTS

| | | |
|---|---|---|
| EP | 1193288 A1 | 4/2002 |
| EP | 1084167 | 9/2002 |
| EP | 1268702 | 1/2003 |
| EP | 1382642 | 1/2004 |
| EP | 1486547 A2 | 12/2004 |
| EP | 1522642 | 4/2005 |
| EP | 1698598 A1 | 9/2006 |
| EP | 1767566 | 4/2007 |
| EP | 2223941 | 9/2010 |
| EP | 2253663 | 11/2010 |
| FR | 2614388 | 10/1988 |
| GB | 809675 | 3/1959 |
| GB | 926749 | 5/1963 |
| GB | 1391172 | 4/1975 |
| GB | 1469331 | 4/1977 |
| GB | 1512066 | 5/1978 |
| GB | 1525541 | 9/1978 |
| GB | 2047258 | 11/1980 |
| GB | 2078805 A | 1/1982 |
| GB | 2173523 | 10/1986 |
| GB | 2251438 | 7/1992 |
| JP | 53113784 | 10/1978 |
| JP | 57101100 | 6/1982 |
| JP | 5811193 | 1/1983 |
| JP | 61195647 | 8/1986 |
| JP | 3-173680 | 7/1991 |
| JP | 05186635 | 7/1993 |
| JP | 7-034023 | 2/1995 |
| JP | 09157627 | 6/1997 |
| JP | 10234314 | 9/1998 |
| JP | 11035491 | 2/1999 |
| JP | 11181690 | 7/1999 |
| JP | 2000327841 | 11/2000 |
| JP | 2002293576 | 9/2002 |
| JP | 2003147276 | 5/2003 |
| JP | 2003238921 | 8/2003 |
| JP | 2004060058 | 2/2004 |
| JP | 2005306919 | 11/2005 |
| NZ | 549563 | 1/2008 |
| RU | 1765996 | 8/1995 |
| SU | 374400 | 3/1973 |
| WO | 1990007541 | 7/1990 |
| WO | 1992012198 | 7/1992 |
| WO | 1995034517 | 12/1995 |
| WO | 1997049646 | 12/1997 |
| WO | 1999036368 | 7/1999 |
| WO | 199947765 | 9/1999 |
| WO | 199960042 | 11/1999 |
| WO | 199960043 | 11/1999 |
| WO | 200058085 | 10/2000 |
| WO | 2001014491 | 3/2001 |
| WO | 2001059026 | 8/2001 |
| WO | 200200429 | 1/2002 |
| WO | 2003029496 | 4/2003 |
| WO | 2003071879 | 9/2003 |
| WO | 2003106561 | 12/2003 |
| WO | 2004076734 | 9/2004 |
| WO | 2005087837 | 9/2005 |
| WO | 2006044302 | 4/2006 |
| WO | 2006136614 | 12/2006 |
| WO | 2007014236 | 2/2007 |
| WO | 2007024020 A1 | 3/2007 |
| WO | 2007050964 | 5/2007 |
| WO | 2007112335 | 10/2007 |
| WO | 2008089847 | 7/2008 |
| WO | 2008089851 | 7/2008 |
| WO | 2008141201 | 11/2008 |
| WO | 2009019235 | 2/2009 |
| WO | 2010139899 | 12/2010 |
| WO | 2011019590 | 2/2011 |
| WO | 2011019593 | 2/2011 |
| WO | 2011019597 | 2/2011 |
| WO | 2011019598 | 2/2011 |
| WO | 2011022224 | 2/2011 |
| WO | 2011022226 | 2/2011 |
| WO | 2011022227 | 2/2011 |
| WO | 2011138458 | 11/2011 |
| WO | 2011138459 | 11/2011 |
| WO | 2013150123 | 10/2013 |

OTHER PUBLICATIONS

Agyei-Aye et al., "The Role of Anion in the Reaction of Reducing Sugars with Ammonium Salts," Carbohydrate Research 2002, 337: 2273-2277.
Laroque et al., "Kinetic study on the Maillard reaction. Consideration of sugar reactivity," Food Chemistry 2008, 111: 1032-1042.
Bjorksten et al., "Polyester Resin—Glass Fiber Laminates," Industrial and Engineering Chemistry (1954).
Dow Corning, "A Guide to Silane Solutions," 2005.
Knauf Data Sheet, 2006.
Molasses Corporation, United States Sugar Corporation, http://www.sugalik.com/molasses/composition.html (Sep. 29, 2003).
Clamen, Guy, "Acrylic Thermosets: A Safe Alternative to Formaldehyde Resins," Nonwovens World, Apr.-May 2004, pp. 96-102.
Opposition to AU 2006272595, Amended Statement of Grounds and Particulars, issued from Australian Patent Office, Jul. 6, 2012, 22 pages.
Decision re Opposition to AU 2006272595, issued from Australian Patent Office, Aug. 14, 2015, 25 pages.
Opposition to EP 1732968, Notice of Opposition: Prior Art, Scope of the Patent, Reasons for the Opposition, issued from European Patent Office, Mar. 8, 2012, 18 pages.
Decision re Opposition to EP 1732968, issued from the European Patent Office, Nov. 14, 2014, 5 pages.
Opposition to EA 019802, submitted to Eurasian Patent Office on Dec. 26, 2014, 36 pages.
Decision re Opposition to EA 019802, issued by Eurasian Patent Office on Aug. 18, 2015, 15 pages.
Owens Corning Retiree Update: What Goes Around, Comes Around: A tale of Natural Binders, revised Mar. 20, 2013 p. 4.
A.P. Bryant, "The Terminology of Sugars," Industrial and Engineering Chemistry, vol. 26, No. 2, p. 231, Feb. 1934.
Food Flavor Chemistry, p. 162, Mar. 21, 2009 (English Abstract).
Office action for co-pending U.S. Appl. No. 12/524,502 (9 pages)—dated Sep. 21, 2012.
Office action for co-pending U.S. Appl. No. 12/524,502 (9 pages)—dated Apr. 4, 2013.
Office action for co-pending U.S. Appl. No. 12/524,512 (7 pages)—dated Aug. 6, 2012.
Office action for co-pending U.S. Appl. No. 12/524,512 (9 pages)—Apr. 1, 2013.
Office action for co-pending U.S. Appl. No. 12/524,512 (14 pages)—dated Nov. 12, 2014.
Office action for co-pending U.S. Appl. No. 12/524,512 (9 pages)—dated Jul. 10, 2015.
Office action for co-pending U.S. Appl. No. 12/524,512 (10 pages)—dated Mar. 23, 2016.
Office action for co-pending U.S. Appl. No. 12/524,512 (13 pages)—dated Oct. 5, 2016.
Office action for co-pending U.S. Appl. No. 12/524,512 (13 pages)—dated Apr. 6, 2018.
Office action for co-pending U.S. Appl. No. 12/524,469 (7 pages)—dated Jun. 7, 2012.
Office action for co-pending U.S. Appl. No. 12/524,469 (8 pages)—dated Jan. 29, 2013.
Office action for co-pending U.S. Appl. No. 12/524,469 (7 pages)—dated Aug. 20, 2013.
Office action for co-pending U.S. Appl. No. 12/524,469 (9 pages)—dated Jun. 9, 2014.
Office action for co-pending U.S. Appl. No. 12/524,469 (9 pages)—dated Oct. 17, 2014.
Office action for co-pending U.S. Appl. No. 12/524,469 (9 pages)—dated Jul. 23, 2015.
Office action for co-pending U.S. Appl. No. 12/524,539 (13 pages)—dated Jun. 21, 2012.

(56) References Cited

OTHER PUBLICATIONS

Office action for co-pending U.S. Appl. No. 12/524,539 (13 pages)—dated Jun. 6, 2013.
Office action for co-pending U.S. Appl. No. 12/524,539 (12 pages)—Dec. 17, 2014.
Office action for co-pending U.S. Appl. No. 12/524,539 (7 pages)—Jul. 15, 2015.
Office action for co-pending U.S. Appl. No. 12/524,539 (7 pages)—dated Mar. 23, 2016.
Office action for co-pending U.S. Appl. No. 12/524,539 (7 pages)—dated Dec. 29, 2016.
Office action for co-pending U.S. Appl. No. 12/524,522 (4 pages)—dated Oct. 11, 2011.
Office action for co-pending U.S. Appl. No. 12/667,718 (5 pages)—dated Sep. 3, 2013.
Office action for co-pending U.S. Appl. No. 12/667,718 (6 pages)—dated Sep. 9, 2014.
Office action for co-pending U.S. Appl. No. 12/671,922 (10 pages)—dated Oct. 7, 2011.
Office action for co-pending U.S. Appl. No. 12/671,922 (10 pages)—dated May 10, 2012.
Office action for co-pending U.S. Appl. No. 12/671,922 (9 pages)—dated Sep. 23, 2014.
Office action for co-pending U.S. Appl. No. 12/671,922 (5 pages)—dated Apr. 4, 2016.
Office action for co-pending U.S. Appl. No. 13/388,408 (5 pages)—dated Aug. 15, 2013.
Office action for co-pending U.S. Appl. No. 13/371,829 (9 pages)—dated Dec. 20, 2012.
Office action for co-pending U.S. Appl. No. 13/371,829 (6 pages)—dated Jul. 12, 2013.
Office action for co-pending U.S. Appl. No. 13/371,829 (6 pages)—dated Aug. 12, 2014.
Office action for co-pending U.S. Appl. No. 13/637,794 (8 pages)—dated Aug. 12, 2013.
Office action for co-pending U.S. Appl. No. 13/637,794 (9 pages)—dated Mar. 26, 2014.
Office action for co-pending U.S. Appl. No. 13/696,439 (11 pages)—dated Jan. 8, 2014.
Office action for co-pending U.S. Appl. No. 13/696,452 (7 pages)—dated Jan. 13, 2015.
Office action for co-pending U.S. Appl. No. 13/696,452 (9 pages)—dated Oct. 27, 2015.
Office action for co-pending U.S. Appl. No. 13/702,144 (6 pages)—dated Jan. 10, 2014.
Office action for co-pending U.S. Appl. No. 13/702,144 (7 pages)—dated Jul. 29, 2014.
Office action for co-pending U.S. Appl. No. 13/823,818 (9 pages)—dated Mar. 26, 2015.
Office action for co-pending U.S. Appl. No. 13/866,368 (16 pages)—dated Aug. 29, 2013.
Office action for co-pending U.S. Appl. No. 13/866,368 (11 pages)—dated Apr. 16, 2014.
Office action for co-pending U.S. Appl. No. 13/866,368 (8 pages)—dated Aug. 21, 2014.
Office action for co-pending U.S. Appl. No. 13/866,419 (14 pages)—dated Sep. 20, 2013.
Office action for co-pending U.S. Appl. No. 13/866,419 (10 pages)—dated Apr. 25, 2014.
Office action for co-pending U.S. Appl. No. 13/866,419 (8 pages)—dated Oct. 9, 2014.
Office action for co-pending U.S. Appl. No. 13/866,419 (8 pages)—dated Sep. 25, 2015.
Office action for co-pending U.S. Appl. No. 13/868,233 (23 pages)—dated Aug. 13, 2013.
Office action for co-pending U.S. Appl. No. 13/868,233 (12 pages)—dated Apr. 15, 2014.
Office action for co-pending U.S. Appl. No. 13/868,233 (8 pages)—dated Oct. 7, 2014.
Office action for co-pending U.S. Appl. No. 13/868,233 (8 pages)—dated Jul. 16, 2015.
Office action for co-pending U.S. Appl. No. 13/868,238 (8 pages)—dated Jul. 16, 2014.
Office action for co-pending U.S. Appl. No. 12/976,379 (7 pages)—dated Jan. 10, 2012.
Office action for co-pending U.S. Appl. No. 12/976,379 (6 pages)—dated Jul. 27, 2012.
Office action for co-pending U.S. Appl. No. 12/976,379 (9 pages)—dated Mar. 7, 2013.
Office action for co-pending U.S. Appl. No. 12/976,379 (8 pages)—dated Aug. 20, 2013.
Office action for co-pending U.S. Appl. No. 12/599,858 (8 pages)—dated May 11, 2011.
Office action for co-pending U.S. Appl. No. 13/341,542 (8 pages)—dated Dec. 26, 2012.
Office action for co-pending U.S. Appl. No. 13/341,542 (7 pages)—dated Feb. 10, 2014.
Office action for co-pending U.S. Appl. No. 14/026,394 (6 pages)—dated Aug. 14, 2014.
Office action for co-pending U.S. Appl. No. 14/272,556 (14 pages)—dated Nov. 20, 2014.
Office action for co-pending U.S. Appl. No. 14/272,556 (12 pages)—dated Sep. 17, 2015.
Office action for co-pending U.S. Appl. No. 14/342,069 (17 pages)—dated Dec. 29, 2015.
Office action for co-pending U.S. Appl. No. 14/342,069 (22 pages)—dated Sep. 2, 2016.
Office action for co-pending U.S. Appl. No. 14/342,069 (21 pages)—dated Sep. 26, 2017.
Office action for co-pending U.S. Appl. No. 14/342,069 (21 pages)—dated Jun. 6, 2018.
Office action for co-pending U.S. Appl. No. 14/649,277 (9 pages)—dated Jul. 22, 2016.
Office action for co-pending U.S. Appl. No. 14/686,915 (8 pages)—dated Nov. 18, 2016.
Office action for co-pending U.S. Appl. No. 14/810,765 (7 pages)—dated Jan. 29, 2016.
Office action for co-pending U.S. Appl. No. 14/828,916 (8 pages)—dated Nov. 25, 2016.
Office action for co-pending U.S. Appl. No. 14/867,502 (9 pages)—dated Nov. 18, 2016.
Office action for co-pending U.S. Appl. No. 15/172,432 (16 pages)—dated Apr. 17, 2017.
Office action for co-pending U.S. Appl. No. 15/177,442 (17 pages)—dated May 19, 2017.
Office action for co-pending U.S. Appl. No. 15/378,159 (18 pages)—dated Mar. 2, 2017.
Office action for co-pending U.S. Appl. No. 15/222,122 (8 pages)—dated Nov. 20, 2017.
Office action for co-pending U.S. Appl. No. 15/310,837 (13 pages)—dated Jun. 21, 2018.
Office action for co-pending U.S. Appl. No. 15/411,972 (9 pages)—dated Jun. 14, 2018.
Other information—Narrative of verbal disclosure of Brian Swift (1 page)—dated May 13, 2014.
Petition for Inter Partes Review of U.S. Pat. No. 8,114,210 (52 pages, filed Jun. 12, 2015 by Petitioners Johns Manville Corporation and Johns Manville, Inc.).
Declaration of Dr. Frederick J. Hirsekorn Regarding U.S. Pat. No. 8,114,210 (58 pages, filed Jun. 12, 2015 by Petitioners Johns Manville Corporation and Johns Manville, Inc. in connection with Petition for Inter Partes Review of U.S. Pat. No. 8,114,210).
1st Petition for Inter Partes Review of U.S. Patent No. D. 631,670 (68 pages, filed Jun. 19, 2015 by Petitioners Johns Manville Corporation and Johns Manville, Inc.).
2nd Petition for Inter Partes Review of U.S. Patent No. D. 631,670 (62 pages, filed Nov. 2, 2015 by Petitioners Johns Manville Corporation and Johns Manville, Inc.).
Decision of PTAB regarding Institution of Inter Partes Review for U.S. Patent No. D. 631,670 (33 pages)—dated Jan. 12, 2016.
Decision2 of PTAB regarding Institution of Inter Partes Review for U.S. Patent No. D631,670 (27 pages)—dated May 9, 2016.

(56) References Cited

OTHER PUBLICATIONS

Final Written Decision of PTAB regarding Inter Partes Review of D. 631,670 based on 1st Petition (56 pages)—dated Jan. 11, 2017.
Final Written Decision of PTAB regarding Inter Partes Review of D. 631,670 based on 2nd Petition (55 pages)—dated May 8, 2017.
Court of Appeals for Federal Circuit Judgment from Appeal of PTAB Decisions in Inter Partes Reviews of U.S. Patent No. D. 631,670 (2 pages)—dated Jul. 13, 2018.
1st Petition for Inter Partes Review of U.S. Pat. No. 8,940,089 (61 pages, filed Jul. 1, 2015 by Petitioners Johns Manville Corporation and Johns Manville, Inc.).
Declaration of Dr. Frederick J. Hirsekorn Regarding U.S. Pat. No. 8,940,089 (70 pages, filed Jul. 1, 2015 by Petitioners Johns Manville Corporation and Johns Manville, Inc. in connection with 1st Petition for Inter Partes Review of U.S. Pat. No. 8,940,089).
2nd Petition for Inter Partes Review of U.S. Pat. No. 8,940,089 (56 pages, filed Jul. 10, 2015 by Petitioners Johns Manville Corporation and Johns Manville, Inc.).
Declaration of Dr. Frederick J. Hirsekorn Regarding U.S. Pat. No. 8,940,089 (67 pages, filed Jul. 10, 2015 by Petitioners Johns Manville Corporation and Johns Manville, Inc. in connection with 2nd Petition for Inter Partes Review of U.S. Pat. No. 8,940,089).
3rd Petition for Inter Partes Review of U.S. Pat. No. 8,940,089 (62 pages, filed Jul. 17, 2015 by Petitioners Johns Manville Corporation and Johns Manville, Inc.).
Declaration of Dr. Frederick J. Hirsekorn Regarding U.S. Pat. No. 8,940,089 (76 pages, filed Jul. 17, 2015 by Petitioners Johns Manville Corporation and Johns Manville, Inc. in connection with 3rd Petition for Inter Partes Review of U.S. Pat. No. 8,940,089).
Declaration of Dr. Elam Leed (11 pages, filed Jul. 1, Jul. 10, and Jul. 17, 2015 by Petitioners Johns Manville Corporation and Johns Manville, Inc. in connection with 1st, 2nd and 3rd Petition for Inter Partes Review of U.S. Pat. No. 8,940,089, respectively).
Declaration of Dr. Jonathan Vickers (10 pages, filed Jul. 1, Jul. 10, and Jul. 17, 2015 by Petitioners Johns Manville Corporation and Johns Manville, Inc. in connection with 1st, 2nd and 3rd Petition for Inter Partes Review of U.S. Pat. No. 8,940,089, respectively).
1st Petition for Inter Partes Review of U.S. Pat. No. 9,039,827 (60 pages, filed Jul. 29, 2015 by Petitioners Johns Manville Corporation and Johns Manville, Inc.).
Declaration of Dr. Frederick J. Hirsekorn Regarding U.S. Pat. No. 9,039,827 (72 pages, filed Jul. 29, 2015 by Petitioners Johns Manville Corporation and Johns Manville, Inc. in connection with 1st Petition for Inter Partes Review of U.S. Pat. No. 9,039,827).
2nd Petition for Inter Partes Review of U.S. Pat. No. 9,039,827 (51 pages, filed Aug. 5, 2015 by Petitioners Johns Manville Corporation and Johns Manville, Inc.).
Declaration of Dr. Frederick J. Hirsekorn Regarding U.S. Pat. No. 9,039,827 (65 pages, filed Aug. 5, 2015 by Petitioners Johns Manville Corporation and Johns Manville, Inc. in connection with 2nd Petition for Inter Partes Review of U.S. Pat. No. 9,039,827).
3rd Petition for Inter Partes Review of U.S. Pat. No. 9,039,827 (57 pages, filed Aug. 7, 2015 by Petitioners Johns Manville Corporation and Johns Manville, Inc.).
Declaration of Dr. Frederick J. Hirsekorn Regarding U.S. Pat. No. 9,039,827 (75 pages, filed Aug. 7, 2015 by Petitioners Johns Manville Corporation and Johns Manville, Inc. in connection with 3rd Petition for Inter Partes Review of U.S. Pat. No. 9,039,827).
Declaration of Dr. Elam Leed (11 pages, filed Jul. 29, Aug. 5, and Aug. 7, 2015 by Petitioners Johns Manville Corporation and Johns Manville, Inc. in connection with 1st, 2nd and 3rd Petition for Inter Partes Review of U.S. Pat. No. 9,039,827, respectively).
Declaration of Dr. Jonathan Vickers (10 pages, filed Jul. 29, Aug. 5, and Aug. 7, 2015 by Petitioners Johns Manville Corporation and Johns Manville, Inc. in connection with 1st, 2nd and 3rd Petition for Inter Partes Review of U.S. Pat. No. 9,039,827, respectively).
Petition for Inter Partes Review of U.S. Pat. No. 9,469,747 (67 pages, filed Mar. 20, 2018 by Petitioners Johns Manville Corporation and Johns Manville, Inc.).

Petition for Inter Partes Review of U.S. Pat. No. 9,828,287 (86 pages, filed Mar. 23, 2018 by Petitioners Johns Manville Corporation and Johns Manville, Inc.).
Petition for Inter Partes Review of U.S. Pat. No. 9,464,207 (78 pages, filed Mar. 28, 2018 by Petitioners Johns Manville Corporation and Johns Manville, Inc.).
Petition for Inter Partes Review of U.S. Pat. No. 9,926,464 (74 pages, filed Mar. 30, 2018 by Petitioners Johns Manville Corporation and Johns Manville, Inc.).
Final Rejection in Ex Parte Reexamination of U.S. Pat. No. 7,888,445 (20 pages)—Jul. 24, 2015.
Final Rejection in Ex Parte Reexamination of U.S. Pat. No. 7,772,347 (23 pages)—Jul. 24, 2015.
Final Rejection in Ex Parte Reexamination of U.S. Pat. No. 7,854,980 (31 pages)—Aug. 18, 2015.
Advisory Action in Ex Parte Reexamination of U.S. Pat. No. 7,888,445 (4 pages)—Oct. 6, 2015.
Advisory Action in Ex Parte Reexamination of U.S. Pat. No. 7,772,347 (4 pages)—Oct. 6, 2015.
Advisory Action in Ex Parte Reexamination of U.S. Pat. No. 7,854,980 (4 pages)—Nov. 18, 2015.
Examiner's Answer in Ex Parte Reexamination of U.S. Pat. No. 7,888,445 (8 pages)—Mar. 23, 2016.
Examiner's Answer in Ex Parte Reexamination of U.S. Pat. No. 7,772,347 (8 pages)—Mar. 23, 2016.
Examiner's Answer in Ex Parte Reexamination of U.S. Pat. No. 7,854,980 (8 pages)—Mar. 22, 2016.
Decision of PTAB in Ex Parte Reexamination of U.S. Pat. No. 7,888,445 (17 pages)—Sep. 29, 2016.
Decision of PTAB in Ex Parte Reexamination of U.S. Pat. No. 7,772,347 (18 pages)—Sep. 29, 2016.
Decision of PTAB in Ex Parte Reexamination of U.S. Pat. No. 7,854,980 (22 pages)—Sep. 30, 2016.
Court of Appeals for Federal Circuit Judgment from Consolidated Appeal of PTAB Decisions in Ex Parte Reexamination of U.S. Pat. No. 7,888,445, 7,772,347 and 7,854,980 (5 pages)—Mar. 9, 2018.
Decision of PTAB in Inter Partes Reexamination of U.S. Pat. No. 7,888,445 (34 pages)—May 1, 2015.
Decision of PTAB in Inter Partes Reexamination of U.S. Pat. No. 7,772,347 (36 pages)—May 1, 2015.
Decision of PTAB in Inter Partes Reexamination of U.S. Pat. No. 7,854,980 (25 pages)—Jul. 30, 2015.
Remand Order of PTAB in Inter Partes Reexamination of U.S. Pat. No. 7,888,445 (5 pages)—Dec. 9, 2015.
Remand Order of PTAB in Inter Partes Reexamination of U.S. Pat. No. 7,772,347 (5 pages)—Dec. 9 , 2015.
Examiner's Determination on Patent Owner Response/Requester Comments after Board Decision in Inter Partes Reexamination of U.S. Pat. No. 7,888,445 (22 pages)—Oct. 17, 2016.
Examiner's Determination on Patent Owner Response/Requester Comments after Board Decision in Inter Partes Reexamination of U.S. Pat. No. 7,772,347 (17 pages)—Oct. 17, 2016.
Court of Appeals for Federal Circuit Opinion/Judgment from Appeal of PTAB Decision in Inter Partes Reexamination of U.S. Pat. No. 7,854,980 (13 pages)—Feb. 27, 2017.
Final Decision of PTAB in Inter Partes Reexamination of U.S. Pat. No. 7,888,445 (25 pages)—Sep. 8, 2017.
Final Decision of PTAB in Inter Partes Reexamination of U.S. Pat. No. 7,772,347 (24 pages)—Sep. 8, 2017.
Decision of PTAB re Request for Rehearing in Inter Partes Reexamination of U.S. Pat. No. 7,888,445 (7 pages)—Feb. 12, 2018.
Decision of PTAB re Request for Rehearing in Inter Partes Reexamination of U.S. Pat. No. 7,772,347 (7 pages)—Feb. 12, 2018.
Decision of PTAB regarding Institution of Inter Partes Review for U.S. Pat. No. 8,114,210 (20 pages)—Oct. 21, 2015.
Final Written Decision of PTAB regarding Inter Partes Review of U.S. Pat. No. 8,114,210 (39 pages)—dated Oct. 19, 2016.
Court of Appeals for Federal Circuit Judgment from Appeal of PTAB Decision in Inter Partes Review of U.S. Pat. No. 8,114,210 (5 pages)—Jan. 16, 2018.
Decision1 of PTAB declining Institution of Inter Partes Review for U.S. Pat. No. 8,940,089 (16 pages)—Dec. 17, 2015.

(56) References Cited

OTHER PUBLICATIONS

Decision2 of PTAB declining Institution of Inter Partes Review for U.S. Pat. No. 8,940,089 (19 pages)—Dec. 17, 2015.
Decision3 of PTAB declining Institution of Inter Partes Review for U.S. Pat. No. 8,940,089 (14 pages)—Dec. 17, 2015.
Decision1 of PTAB declining Institution of Inter Partes Review for U.S. Pat. No. 9,039,827 (16 pages)—Jan. 4, 2016.
Decision2 of PTAB declining Institution of Inter Partes Review for U.S. Pat. No. 9,039,827 (19 pages)—Jan. 4, 2016.
Decision3 of PTAB declining Institution of Inter Partes Review for U.S. Pat. No. 9,039,827 (14 pages)—Jan. 4, 2016.
Statement of Revocation Grounds re GB2496951—Claimant Rockwool International (May 21, 2018, 22 pages).
Statement of Revocation Grounds re GB2451719—Claimant Rockwool International (May 18, 2018, 22 pages).
File Wrapper re U.S. Pat. No. 2,965,504—Part 1 (10 pages).
File Wrapper re U.S. Pat. No. 2,965,504—Part 2 (14 pages).
File Wrapper re U.S. Pat. No. 2,965,504—Part 3 (14 pages).
Gogek Attorney Comments re U.S. Pat. No. 2,965,504—Apr. 6, 1960 (3 pages).
Gogek Affidavit Under Rule 132 re U.S. Pat. No. 2,965,504—Feb. 26, 1960 (3 pages).
Decision of PTAB denying Institution of Inter Partes Review for U.S. Pat. No. 9,926,464 (29 pages)—Oct. 2, 2018.
Decision of PTAB denying Institution of Inter Partes Review for U.S. Pat. No. 9,464,207 (28 pages)—Oct. 2, 2018.
Decision of PTAB denying Institution of Inter Partes Review for U.S. Pat. No. 9,469,747 (29 pages)—Oct. 3, 2018.
Decision of PTAB denying Institution of Inter Partes Review for U.S. Pat. No. 9,828,287 (22 pages)—Oct. 16, 2018.
Expert Report re Revocation of GB2451719 and GB2496951—Claimant Rockwool International (Nov. 12, 2018, 11 pages).

\* cited by examiner

WOOD BOARD AND PROCESS FOR ITS PRODUCTION

CROSS-REFERENCE TO RELATED APPLICATIONS

This application is a continuation of U.S. application Ser. No. 14/422,104, filed Feb. 17, 2015, which is a U.S. national counterpart application under 35 U.S.C. § 371 of International Application Serial No. PCT/EP2013/067204, filed Aug. 17, 2013, which claims priority to GB Application Serial No. 1214734.4, filed Aug. 17, 2012, the entire disclosures of which are expressly incorporated by reference herein.

TECHNICAL FIELD

The present application relates to wood boards, particularly post-cured wood boards and more particularly to particle board with excellent swelling properties; it also relates to a process for production of such boards.

BACKGROUND

Particle board is a composite material which is typically manufactured from various kinds of wood particles, such as wood chips, sawmill shavings or saw dust. It can be used especially for the manufacture of various types of furniture, such as cabinets, kitchens, bath furniture and so forth. Generally, particle board (which is sometimes referred to as "chipboard") is usually produced by mixing wood particles and a binder composition, e.g. a thermo-curable resin, subsequently forming the resulting mixture into a sheet and compressing said sheet under elevated temperatures. Most commonly, urea formaldehyde (UF), melamine urea formaldehyde (MUF) and phenol formaldehyde have been used as binder systems in particle board. Moreover, a variety of additives can be used, including waxes, dyes and release agents, which supplement the particle board with further desired properties. In order to improve the visual appearance and durability of particle board, veneer can be applied onto its visible surfaces.

Particle board has a variety of advantages over conventional wood products and plywood since it is cheaper, and generally denser and more uniform. As a consequence, in many applications particle board has replaced these conventional materials, predominantly for cost reasons.

However, one major disadvantage of particle board in certain applications is that it undergoes significant swelling upon exposure to moisture over a prolonged period of time. This is particularly based on the fact that, particularly urea formaldehyde particle board, is considerably hygroscopic. Exposure to humidity or direct contact with water usually leads to swelling of the material. As a consequence, appearance and strength of the particle board are significantly impaired. Due to this sensitivity to moisture, the application of particle board in humid environments can be disadvantageously restricted. Resistance to moisture and swelling are also important considerations for other types of wood boards, for example plywood, although the structure of plywood generally renders it less susceptible to moisture and swelling that particle board.

A wood board must, of course, satisfy a combination of requirements including satisfactory internal bond strength, modulus of elasticity, bending strength and dimensional stability. Resistance against decay, for example due to mould and/or biodegradation is also important.

It has previously been attempted to manufacture urea formaldehyde particle board having reduced swelling when exposed to moisture, e.g. by using higher amounts of binder. However, the use of significantly higher amounts of binder negatively affects the particle board's overall properties as well as cost efficiency and the cured UF binders still tend to be hydroscopic.

Moreover, it has been suggested to reduce swelling in UF/MUF particle board by applying heat to the finished product, whereby the particle board generally becomes less hygroscopic and hot pressing stress is relieved. However, even though such techniques may basically lead to reduced swelling of the particle board, the extensive application of heat also leads to degradation of the cured UF/MUF binders whereby the structural integrity of the product is negatively influenced.

One specific technical problem underlying the present invention is thus to overcome the above negative effects and to provide particle board with reduced swelling in the thickness direction and a process for producing such particle board.

SUMMARY

The above technical problem is solved according to the present invention by providing a process for manufacturing wood board, comprising the steps of:
(a) providing wood pieces;
(b) applying a carbohydrate binder composition to the wood pieces provided in step (a);
(c) forming the wood pieces obtained in step (b) into a sheet;
(d) heating and pressing the sheet obtained in step (c) to obtain a cured wood board; and
(e) post-curing the wood board obtained in step (d).

In one embodiment the wood board is a particle board and the invention provides a process for manufacturing particle board, comprising the steps:
(a) providing wood particles;
(b) mixing the wood particles provided in step (a) with a carbohydrate binder composition;
(c) forming the mixture obtained in step (b) into a sheet;
(d) heating and pressing the sheet obtained in step (c) to obtain a cured particle board; and
(e) post-curing the particle board obtained in step (d).

DETAILED DESCRIPTION

Figure 1:
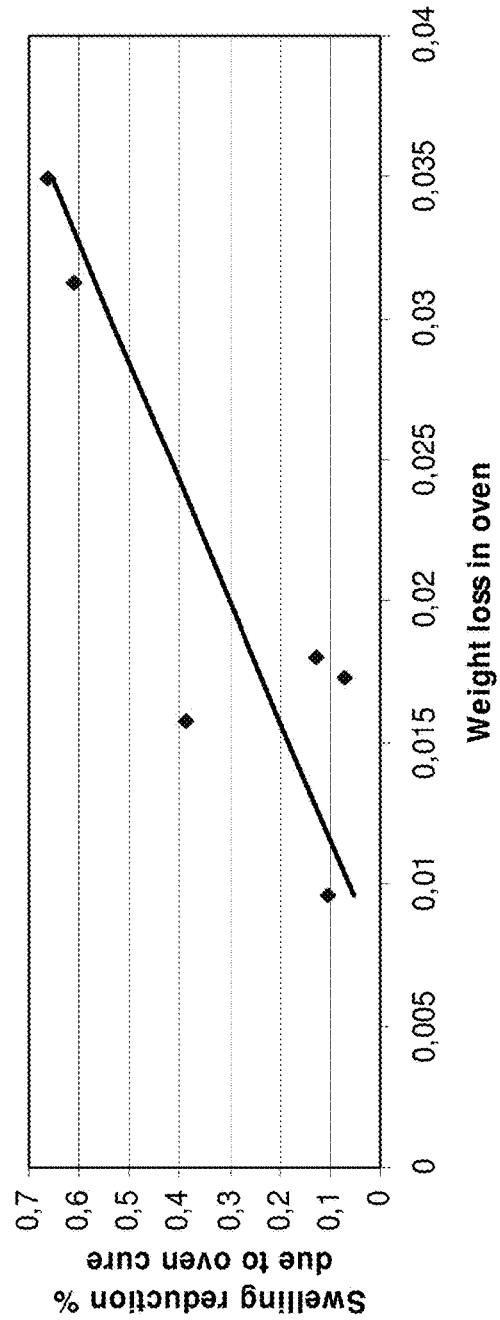
FIG. 1 shows weight loss against swelling reduction in percent due to oven post curing at 140° C. for 24 hours. Binders were 40:40:20 DMH:FRU:HMDA, boards were pressed for 14 seconds/mm.

Herein, the term "particle board" includes any kind of particle board which comprises wood particles and a binder composition. Examples of such particle board include medium-density fiberboards (MDF), hardboards or high-density fiberboards having various degrees of density and strength, as well as oriented strand board (OSB). The particle board may be uniform or may have a non-uniform structure, e.g. comprising different layers of material. For example, the particle board may have 3 layers, such as a core layer and two surface layers, wherein each layer may comprise a different wood material and/or grade of wood material and/or density and/or different binder compositions and/or amounts of binders.

The thickness of the particle board may be in the range of 5 to 100 mm. Preferred thicknesses are in the range of 10 to 45 mm or 16 to 22 mm. The thickness of the wood board may be ≥5 mm, ≥8 mm, ≥10 mm, or ≥15 mm and/or ≤100 mm, ≤80 mm, ≤60 mm, ≤50 mm, ≤45 mm or ≤25 mm.

The length of the wood board may be ≥1.5 m, ≥2 m, ≥2.5 m or ≥3 m and/or ≤8 m, ≤6 m or ≤5 m. The width of the wood board may be ≥1 m, ≥1.2 m, ≥1.5 m or ≥1.8 m and/or ≤4 m, ≤3 m or ≤3.5 m.

The term "wood particle" used herein includes any kind of wooden particles or fibers, such as wood chips, wood flakes, sawmill shavings and saw dust or mixtures thereof. Wood particles from both virgin wood and/or reclaimed wood can be used to produce the particle boards of the present invention. In addition, any kind of wood such as birch, beech, alder, pine, spruce, tropical wood and the like can be used as a source for said wood particles. According to the present invention, it is further possible to use mixtures of different types of wood in the manufacture of a particle board. Moreover, wood particles used in the process as defined above may be pre-dried to less than 8%, less than 6% or less than 5% moisture. For example the wood particles may be pre-dried to a moisture content of 1 to 5% moisture, e.g. 2 to 4% moisture or 1.5 to 3.5% moisture.

The expression "carbohydrate binder composition" according to the present invention includes any kind of carbohydrate-based binder composition which can be used for producing particle board or wood board. In contrast to the conventional UF/MUF binders employed in particle board manufacture, the carbohydrate binder used in the process of the present invention is preferably free of or essentially free of formaldehyde and may thus avoid issues associated with use and/or emissions of formaldehyde. Such carbohydrate binder compositions may be no-added formaldehyde binders.

The carbohydrate binder composition may be a binder composition that comprises at least 40% by dry weight carbohydrate(s); it may comprise at least 50%, at least 55% or at least 60% by dry weight carbohydrate(s).

Whilst not wishing to be bound by theory, it is believed that one advantage provided by the post-curing of the present invention associated with carbohydrate based binders is the possible breakdown or conversion of hygroscopic components in the binder, for example, hemicellulose when present, and the possible incorporation of such components in a cured form; it is believed that this reduces overall water pickup and/or retention and/or swelling. In this way, such degradation products may be useful in actually contributing to the binder efficiency. Furthermore, wood stress release and/or potential increased bacterial resistance may be achieved; for example, any hemicellulose present may support microbial growth and reduction and/or elimination of this or similar species may reduce any susceptibility of the finished product to decay, mould or biodegradation.

Preferably, subsequent to the step (d) of heating and pressing the sheet to obtain a cured wood board and prior to the step (e) of post-curing the wood board, the wood board has:

a) an internal bond strength of ≥0.1 N/mm$^2$ or ≥0.15 N/mm$^2$, preferably ≥0.2 N/mm$^2$ and more preferably ≥0.25 N/mm$^2$, notably measured according to EN 310:1993; and/or b) a modulus of elasticity in bending of ≥1000 N/mm$^2$, preferably ≥1200 N/mm$^2$ and more preferably ≥1300 N/mm$^2$, notably measured according to EN310:1993; and/or c) a bending strength of ≥5 N/mm$^2$, preferably ≥7 N/mm$^2$ and more preferably ≥10 N/mm$^2$, notably measured according to EN310:1993.

According to one embodiment of the above-defined process, the carbohydrate binder composition comprises at least one carbohydrate component; it may comprise at least one carbohydrate component and at least one amine component.

Herein, the term "carbohydrate component" includes any carbohydrate compound which is capable of reacting (e.g. by application of heat) with the amine component, and optionally further crosslinkers, in order to form a suitably cured product. According to the present invention, the carbohydrate component may be selected from the group consisting of monosaccharides, disaccharides, polysaccharides or a reaction product thereof. The carbohydrate component may comprise at least one reducing sugar.

As used herein, the term "reducing sugar" indicates one or more sugars that contain aldehyde groups, or that can isomerize, i.e. tautomerize, to contain aldehyde groups, which groups may be oxidized with, for example, Cu-ions to afford carboxylic acids. According to the present invention, any such carbohydrate component may be optionally substituted, such as with hydroxy, halo, alkyl, alkoxy, and the like. In any such carbohydrate component, one or more chiral centers may be present, and both possible optical isomers at each chiral center are included in the invention described herein. Further, it is also to be understood that various mixtures, including racemic mixtures, or other diastereomeric mixtures of the various optical isomers of any such carbohydrate component, as well as various geometric isomers thereof, may be used in one or more embodiments described herein.

Moreover, while non-reducing sugars, for instance sucrose, may not be preferable, they may none the less be useful within the scope of the present invention, for example by in situ conversion to a reducing sugar. Further, it is also understood that a monosaccharide, a disaccharide, or a polysaccharide may be partially reacted with a precursor to form a carbohydrate reaction product. To the extent that the carbohydrate reaction product is derived from a monosaccharide, a disaccharide, or a polysaccharide, and maintains similar reactivity with the amine component to form reaction products similar to those of a monosaccharide, a disaccharide, or a polysaccharide with an amine component, the carbohydrate reaction product is within the scope of the expression "carbohydrate component".

The carbohydrate binder composition may comprise a water soluble pre-reacted binder composition, comprising the reaction product(s) of (i) at least one carbohydrate component, and (ii) at least one nitrogen-containing component. The weight ratio between the carbohydrate component and the nitrogen-containing component may be 0.5:1 to 30:1.

The binder may be in the form of an aqueous solution or dispersion containing at least 20 wt.-%, for example at least 25% wt.-, 30% wt.-, 35% wt.-, 40% wt.-, 45 wt.-%, 50 wt.-%, 55 wt.-%, 60 wt.-%, 65 wt.-%, 70 wt.-%, 75 wt.-% or 80 wt.-% of said pre-reacted binder composition and/or no more than 85 wt.-%, for example no more that 80 wt.-%, 75 wt.-% or 70 wt.-% of said pre-reacted binder composition.

As used herein, the term "pre-reacted binder composition" includes any chemical composition obtainable and/or obtained by reacting a carbohydrate component and a nitrogen-containing component, which may be used as a binder, e.g. for binding loosely assembled matter, either as such or upon further modification.

The pre-reacted binder composition of preferred embodiments of the present invention is based on a carbohydrate component/nitrogen-containing component binder system, i.e. the carbohydrate component(s) and nitrogen-containing component(s) are not only present in small amounts in the starting material to prepare the pre-reacted binder composition of the present invention, but are the major components of the starting material. Accordingly, the total amount of the at least one carbohydrate component and the at least one nitrogen-containing component in the starting material to prepare the pre-reacted binder composition may be at least 20 wt.-%, based on the total weight of the binder composition before pre-reaction. For example, the total amount of the at least one carbohydrate component and the at least one nitrogen-containing component may be at least 30 wt.-%, 40 wt.-%, 50 wt.-%, 60 wt.-%, 70 wt.-%, 80 wt.-%, 90 wt.-%, 95 wt.-%, or 98 wt.-% before pre-reaction.

According to one embodiment of the present invention, the total amount of the reaction product(s) of (i) at least one carbohydrate component and (ii) at least one nitrogen-containing component, the unreacted carbohydrate component(s) and the unreacted nitrogen-containing component(s) in the pre-reacted binder composition, i.e. (amount of reaction product(s) of (i) and (ii))+(amount of unreacted carbohydrate component(s))+(amount of unreacted nitrogen-containing component(s)), is at least 20 wt.-%, based on the total weight of the pre-reacted binder composition, for example at least 30 wt.-%, 40 wt.-%, 50 wt.-%, 60 wt.-%, 70 wt.-%, 80 wt.-%, 90 wt.-%, 95 wt.-%, or 98 wt.-%.

The binder may be:
  a binder disclosed in international patent application no. PCT/EP2013/057151;
  a binder disclosed in U.S. patent application Ser. No. 13/696,439 (published as US 2013/0059075 A1); or
  a binder disclosed in U.S. patent application Ser. No. 13/696,452 (published as US 2013/0047888 A1);
each of which is hereby incorporated by reference.

Preferably, any carbohydrate component should be sufficiently non-volatile to maximize its ability to remain available for reaction with the amine component. The carbohydrate component may be a monosaccharide in its aldose or ketose form, including a triose, a tetrose, a pentose, a hexose, or a heptose; or a polysaccharide; or combinations thereof. For example, when a triose serves as the carbohydrate component, or is used in combination with other reducing sugars and/or a polysaccharide, an aldotriose sugar or a ketotriose sugar may be utilized (including glyceraldehyde and dihydroxyacetone, respectively). When a tetrose serves as the carbohydrate component, or is used in combination with other reducing sugars and/or a polysaccharide, aldotetrose sugars (including erythrose and threose) and ketotetrose sugars (including erythrulose), may be utilized. Moreover, when a pentose serves as the carbohydrate component, or is used in combination with other reducing sugars and/or a polysaccharide, aldopentose sugars (including ribose, arabinose, xylose, and lyxose) and ketopentose sugars (including ribulose, arabulose, xylulose, and lyxulose), may be utilized. When a hexose serves as the carbohydrate component, or is used in combination with other reducing sugars and/or a polysaccharide, aldohexose sugars (including glucose (i.e. dextrose), mannose, galactose, allose, altrose, talose, gulose, and idose) and ketohexose sugars (including fructose, psicose, sorbose and tagatose), may be utilized. When a heptose serves as the carbohydrate component, or is used in combination with other reducing sugars and/or a polysaccharide, a ketoheptose sugar (including sedoheptulose) may be utilized. Other stereoisomers of such carbohydrate components not known to occur naturally are also contemplated to be useful in preparing the binder compositions as described herein. In one embodiment, the carbohydrate component is high fructose corn syrup (HFCS).

As mentioned above, the carbohydrate component may be a polysaccharide. For example, the carbohydrate component may be polysaccharide with a low degree of polymerization and includes e.g. molasses, starch, cellulose hydrolysates, or mixtures thereof. According to a specific example, the carbohydrate component is a starch hydrolysate, a maltodextrin, or a mixture thereof. While carbohydrates of higher degrees of polymerization may not be preferable, they may none the less be useful within the scope of the present invention particularly by in situ depolymerization.

Furthermore, according to the present invention, the carbohydrate component may be used in combination with a non-carbohydrate polyhydroxy reactant. Examples of non-carbohydrate polyhydroxy reactants which can be used in combination with the carbohydrate component include, but are not limited to, trimethylolpropane, glycerol, pentaerythritol, polyvinyl alcohol, partially hydrolyzed polyvinyl acetate, fully hydrolyzed polyvinyl acetate, and mixtures thereof. For example, the non-carbohydrate polyhydroxy reactant is sufficiently non-volatile to maximize its ability to remain available for reaction with an amine component. Moreover, according to the present invention, the hydrophobicity of the non-carbohydrate polyhydroxy reactant may be a factor in determining the physical properties of a binder prepared as described herein.

Further, herein the expression "amine component" includes any chemical compound, or mixture of compounds, which contain(s) at least one nitrogen atom and which is/are capable of reacting with the at least one carbohydrate component.

According to the present invention, the at least one amine component may be selected from $NH_3$, an inorganic amine or an organic amine comprising at least one primary amine group, as well as salts thereof. For example, as the amine component, $NH_3$ may be used as such (e.g. in form of an aqueous solution), as well as in from of any type of inorganic and organic ammonium salt thereof, as long as these salts are capable of reacting with the carbohydrate component defined above. Specific examples of inorganic ammonium salts include ammonium sulfate ($AmSO_4$), ammonium chloride, and ammonium nitrate.

Moreover, according to the present invention, the amine component may be a polyamine. Herein, the term "polyamine" includes any organic compound having two or more amine groups, which may independently be substituted or unsubstituted.

For example, the polyamine may be a primary polyamine. As used herein, a "primary polyamine" is an organic compound having two or more primary amine groups (—$NH_2$). Within the scope of the term primary polyamine are those compounds which can be modified in situ or isomerize to generate a compound having two or more primary amine groups (—$NH_2$).

According to one embodiment of the present invention, the primary polyamine may be a molecule having the formula $H_2N$-Q-$NH_2$, wherein Q is an alkyl, cycloalkyl, heteroalkyl, or cycloheteroalkyl, each of which may be optionally substituted. For example, Q may be an alkyl group selected from $C_2$-$C_{24}$, an alkyl group selected from $C_2$-$C_9$, or an alkyl group selected from $C_3$-$C_7$. According to a preferred embodiment, Q is a $C_6$ alkyl. According to another embodiment, Q may be a cyclohexyl, cyclopentyl or cyclobutyl, or a benzyl group.

As used herein, the term "alkyl" includes a chain of carbon atoms, which may optionally be branched. It is to be further understood that alkyl is preferably of limited length, including $C_1$-$C_{24}$, $C_1$-$C_{12}$, $C_1$-$C_8$, $C_1$-$C_6$, and $C_1$-$C_4$. In particular, shorter alkyl groups may add less lipophilicity to the compound and accordingly will have different reactivity towards the carbohydrate component and solubility in a binder solution.

As used herein, the term "cycloalkyl" includes a chain of carbon atoms, which may optionally be branched, where at least a portion of the chain is cyclic. Moreover, according to the present invention it is to be noted that the term "cycloalkyl" also includes polycyclic structures. For example, such cycloalkyls include, but are not limited to, cyclopropyl, cyclopentyl, cyclohexyl, 2-methylcyclopropyl, cyclopentyleth-2-yl, adamantyl, and the like. Furthermore, the chain forming cycloalkyl is advantageously of limited length, including $C_3$-$C_{24}$, $C_3$-$C_{12}$, $C_3$-$C_8$, $C_3$-$C_6$, and $C_5$-$C_6$. According to the present invention, shorter alkyl chains forming cycloalkyl may add less lipophilicity to the compound and accordingly will have a different behavior.

As used herein, the term "heteroalkyl" includes a chain of atoms that includes both carbon and at least one heteroatom, and is optionally branched. Examples of such heteroatoms include nitrogen, oxygen, and sulfur. In certain variations, said hetero-atoms also include phosphorus, and selenium. In one embodiment, a heteroalkyl is a polyether. As used herein, the term "cycloheteroalkyl", includes a chain of atoms that includes both carbon and at least one heteroatom, such as heteroalkyl, and may optionally be branched, where at least a portion of the chain is cyclic. Particularly, examples of cycloheteroalkyl include, but are not limited to, tetrahydrofuryl, pyrrolidinyl, tetrahydropyranyl, piperidinyl, morpholinyl, piperazinyl, homopiperazinyl, quinuclidinyl, and the like.

Herein, the term "optionally substituted" includes the replacement of hydrogen atoms with other functional groups. Such other functional groups include, but are not limited to, amino, hydroxyl, halo, thiol, alkyl, haloalkyl, heteroalkyl, aryl, arylalkyl, arylheteroalkyl, nitro, sulfonic acids and derivatives thereof, carboxylic acids and derivatives thereof, and the like. Moreover, according to the present invention, any of amino, hydroxyl, thiol, alkyl, haloalkyl, heteroalkyl, aryl, arylalkyl, arylheteroalkyl, and/or sulfonic acid is optionally substituted.

For example, the primary polyamine may be a diamine, triamine, tetramine, or pentamine. According to a specific embodiment, the polyamine is a triamine selected from a diethylenetriamine, 1-piperazineethaneamine, or bis(hexamethylene)triamine. In another embodiment, the polyamine is a tetramine, for example triethylenetetramine. In another embodiment, the polyamine is a pentamine, for example tetraethylenepentamine.

One feature of the primary polyamine is that it may possess low steric hindrance. For example, 1,2-diaminoethane, 1,4-diaminobutane, 1,5-diaminopentane, 1,6-diaminohexane, 1,12-diaminododecane, 1,4-diaminocyclohexane, 1,4-diaminobenzene, diethylenetriamine, triethylenetetramine, tetraethylenepentamine, 1-piperazineethaneamine, 2-methyl-pentamethylenediamine, 1,3-pentanediamine, and bis(hexamethylene)triamine, as well as 1,8-diaminooctane have low steric hindrance within the scope of the present invention.

According to a preferred embodiment of the process as defined above, the amine component is the primary polyamine 1,6-diaminohexane (hexamethylenediamine, HMDA). In a further embodiment, the amine component is 1,5-diamino-2-methylpentane (2-methyl-pentamethylenediamine).

In another embodiment, the amine component is the primary polyamine polyether-polyamine. For example, according to the present invention, said polyether-polyamine is a diamine or a triamine. In one embodiment, the polyether-polyamine is a trifunctional primary amine having an average molecular weight of 440 known as Jeffamine T403 Polyetheramine (e.g. Huntsman Corporation).

In a further embodiment, the amine component may include a polymeric polyamine. For example, polymeric polyamines within the scope of the present invention include chitosan, polylysine, polyethylene imine, poly(N-vinyl-N-methyl amine), polyaminostyrene and polyvinylamines. In a specific example, the amine component comprises a polyvinyl amine. As used herein, the polyvinyl amine can be a homopolymer or a copolymer.

A further embodiment of the present invention relates to the above-defined process, wherein the at least one carbohydrate component is selected from the group consisting of ribose, arabinose, xylose, lyxose, glucose (dextrose), mannose, galactose, allose, altrose, talose, gulose, idose, fructose, psicose, sorbose, dihydroxyacetone, sucrose and tagatose, as well as mixtures thereof, and the at least one amine component is selected from the group consisting of ammonium sulfate ($AmSO_4$), ammonium chloride, ammonium nitrate, 1,2-diaminoethane, 1,4-diaminobutane, 1,5-diaminopentane, 1,6-diaminohexane, 1,12-diaminododecane, 1,4-diaminocyclohexane, 1,4-diaminobenzene, diethylenetriamine, triethylenetetramine, tetraethylenepentamine, 1-piperazineethaneamine, 2-methyl-pentamethylenediamine, 1,3-pentanediamine, and bis(hexamethylene)-triamine, 1,8-diaminooctane, as well as mixtures thereof.

The carbohydrate binder composition may be used in the form of a solution and/or dispersion of the at least one carbohydrate component and the at least one amine component in a solvent. Herein, the term "solvent" includes any solvent or mixture of solvents which may be used to dissolve or disperse the carbohydrate component and the amine component. For example, the solvent may be water, an organic solvent or mixtures thereof. Examples of organic solvents include alcohols, ethers, esters, ketones, aldehydes, alkanes and cycloalkanes.

The carbohydrate binder composition may be applied to, for example the wood particles, in the form of an aqueous solution or dispersion containing 10 to 95 wt.-%, 20 to 90 wt.-%, 30 to 85 wt.-%, or 40 to 80 wt.-% of total carbohydrate and amine components, based on the total weight of the solution or dispersion.

The amount of carbohydrate component and amine component includes such amounts which allow the formation of a cured binder. According to one embodiment of the process as defined above, the carbohydrate binder composition comprises 50 to 90 wt.-% of total carbohydrate component and 10 to 50 wt.-% of total amine component, based on the total content of carbohydrate and amine components.

According to a specific example of the present invention, in the above-defined process, the carbohydrate binder composition comprises 25 to 50 wt.-% of dextrose monohydrate (DMH), 25 to 50 wt.-% of fructose and 10 to 50 wt.-% of HMDA, based on the total content of carbohydrate and amine components.

Further examples include binder compositions comprising 10 to 90 wt.-%, 10 to 80 wt.-%, 10 to 70 wt.-%, 10 to 60 wt.-% or 10 to 50 wt.-% of DMH, 5 to 80 wt.-%, 10 to 70 wt.-%, 20 to 60 wt.-% or 30 to 50 wt.-% of fructose, and 5 to 50 wt.-%, 10 to 40 wt.-%, and 15 to 35 wt.-% HMDA, based on the total content of carbohydrate and amine components. It is understood that herein all upper and lower borders of ranges may be arbitrarily combined.

The carbohydrate component and the amine component may be used in stoichiometric amounts which result in an essentially complete curing reaction, or may be used in substoichiometric amounts. For example, the carbohydrate binder composition may be prepared by using less amine component than required for a stoichiometric reaction, and subsequent pre-curing said binder composition, e.g. by applying heat. This pre-reacted binder composition is then supplemented with the remaining amine component, e.g. to achieve a stoichiometric ratio. Using such pre-reacted binder compositions provides advantages regarding shelf life of the binder composition and can result in improved curing processes and better internal bond strength.

According to one embodiment of the present invention, in the carbohydrate binder composition, the ratio of carbonyl groups in the carbohydrate component to reactive amino groups in the amine component may be in the range of 5:1 to 1:2. For example, the ratio of carbonyl groups to reactive nitrogen-containing groups may be in the range of 5:1 to 1:1.8, 5:1 to 1:1.5, 5:1 to 1:1.2, 5:1 to 1:1, 5:1 to 1:0.8 and 5:1 to 1:0.5. Further examples include ratios such as 4:1 to 1:2, 3.5:1 to 1:2, 3:1 to 1:2, 2.5:1 to 1:2, 2:1 to 1:2 and 1.5:1 to 1:2.

Herein, the term "reactive amino group" includes any amino group in the amine component which is capable of reacting with the carbohydrate component. Specifically, examples of such reactive amino groups include primary and secondary amino groups, amide groups, imine and imide groups, as well as cyanate and isocyanate groups.

In contrast to the conventional UF/MUF binders employed in particle board manufacture, the use of a carbohydrate binder composition as defined herein is connected to a variety of advantages. For example, in contrast to UF/MUF binders, during post-curing, carbohydrate binders may undergo improved cure/crosslinking with wood breakdown products and thus potentially result in improved binding properties. In addition, while UF/MUF binder systems are sensitive regarding exposure to elevated temperatures and tend to degrade under prolonged heat exposure, carbohydrate binder systems are thermally stable at the temperatures required for effectively post-curing particle board.

Finally, during the application of heat in the post-curing step, components of the wood, such as hemicellulose, may break down into sugars which potentially participate in the further curing process of the carbohydrate binder and lead to a stronger product.

Furthermore, it is currently thought that the post-curing of the invention may cause sugars which have not been transformed during initial curing to be transformed, cured or otherwise bound up with the carbohydrate binder during post-curing; they would thus no longer pose any potential detrimental effect for bacterial growth and, indeed, may positively contribute to the strength and/or other properties of the binder. If post-curing occurs at least partially at conditions under which released sugars, for example glucose, would not caramelise (for example below about 150° C. at pH9) the invention may provide a particular benefit of incorporating released sugar(s) into the binder. This may be the case in particular with a carbohydrate+amine binder system.

The carbohydrate binder, when cured, may comprise Maillard reaction products, for example melanoidins, and/or polyester components.

Herein, the term "post-curing" is not specifically restricted and simply means heating the particle board to a temperature above room temperature (20° C.).

Post-curing may provoke a temperature in the wood board, particularly in the core of the wood board, higher than that during initial curing. For example, during particle-board production the core of a particleboard rarely increases in temperature beyond 110-115° C. Post-curing may provoke a higher core temperature than in manufacture and thus produce an effect not seen during initial curing.

During the step of post curing the wood board, notably post curing using RF waves, the internal temperature of the wood board, notably the temperature at the centre of the wood board in its thickness direction, may be raised to a temperature of:

a) ≥100° C., ≥110° C., ≥115° C., ≥120° C., ≥130° C. or ≥140° C., and/or b) ≤200° C., ≤180° C., ≤170° C. or ≤160° C.;

notably from a temperature at the end of the step of heating and pressing the board (d) which is lower that the temperature attained during the post-curing step by at least 5° C., at least 10° C. or at least 15° C.

In a further embodiment of the process as defined above, the post-curing in step (e) is carried out at a temperature in the range of 75° C. to 280° C. Further examples of the post-curing temperature include ranges of 80 to 260° C., 90 to 240° C., 110 to 220° C. and 130 to 210° C.

The post-curing step (e) of the above-defined process may be carried out by any suitable technique, such as by a heated press, a conventional oven, hot steam, by electromagnetic radiation (notable with a frequency between 1 MHz and 10 GHz) including microwaves and/or electromagnetic radiation in the radio frequency (RF) range. For example, the post-curing step (e) of the cured particle board obtained in step (d) may be performed by applying electromagnetic irradiation at an energy level of at least 50 W, or at least 80 W or at least 100 W and/or at less than 2000 W, less than 1500 W or less than 1000 W. The power of irradiation applied may be at least 5 kW/m$^2$, at least 10 kW/m$^2$ or at least 20 kW/m$^2$; it may be no more than 200 kW/m$^2$, no more than 150 kW/m$^2$ or no more than 100 kW/m$^2$. For example, typical microwave frequencies include 900 MHz and 2450 MHz, while typical RF wave frequencies includes 13, 17 or 40 MHz, without any limitation thereto. Where RF wave frequencies are used the frequency may be ≥0.5 MHz or ≥1 MHz or ≥5 MHz and/or ≤200 MHz or ≤150 MHz or ≤100 MHz.

Further, according to another example, it is envisaged that use of electromagnetic radiation, notably RF energy, for post-curing of timber boards would be used most effective if applied directly after board exit from the curing press. At this point in the manufacturing process, the internal temperature of the timber board will generally be reasonably high, for example above 100° C. This would reduce the input of electromagnetic energy required to reach a target post-cure temperature of, for example 140° C. or 160° C.

In another embodiment, the post-curing step (e) may be carried out by re-heating the particle board in a press at reduced contact pressure; such a procedure is advantageous in that no additional equipment would be required.

According to the present invention, in the process as defined above, heating in the post-curing in step (e) is carried out for a duration of 10 seconds to 30 hours. Further examples include heating periods of 2 minutes to 24 hours, 5 minutes to 18 hours, 10 minutes to 12 hours and 12 minutes to 8 hours. On the other hand, if electromagnetic waves, for example microwaves and/or RF waves, are applied as the energy source to apply heat during the post-curing step, the heating duration of step (e) can be advantageously reduced to much shorter times when compared to conventional heating by hot air and/or steam. If electromagnetic waves, for example microwaves or RF waves, are employed as the source of heat, heating periods of 10 seconds to 10 minutes, 20 seconds to 8 minutes, 40 seconds to 5 minutes, or 60 seconds to 3 minutes may be employed, depending on thickness and density of the particle board, as well as on the frequency and/or power of the electromagnetic waves. The rate of heating and/or the temperature generated using electromagnetic waves may also be controlled by controlling the amount of water present, for example by controlling the amount of water added and/or the amount of water within the substrate wood and/or the amount of any water generated during curing of the binder.

Prior to the post-curing step (e), a plurality of cured wood boards obtained from step (d) may be arranged to form a stack of wood boards, for example a stack comprising at least 2, 3, 4 or 5 wood boards and/or no more than 20, 15, 10 or 8 wood boards. The stack of wood boards may be arranged with each of the wood boards stacked one on top of the other, for example with each wood board substantially horizontal, and notably with each wood board having its surface covering or substantially covering the surface of adjacent wood boards preferably so that the stack has straight sides. The stack may have an overall thickness of ≥2 cm, ≥5 cm or ≥10 cm and/or ≤200 cm, ≤150 cm or ≤100 cm. The post-curing step (e), especially when using electromagnetic radiation, may be carried out a stack of wood boards.

The post-curing process as such will not only occur during the above-mentioned heating periods, but will continue as long as the temperature of the heated particle board is sufficiently high for the respective chemical curing reactions to take place. Accordingly, the post-curing periods may be significantly longer than the heating periods. For example, a stack of 3 to 10 (e.g. 4 to 8) particle boards might be heated by electromagnetic waves for 10 seconds to 5 minutes (e.g. for 30 seconds to 2 minutes) and subsequently stored in a thermally insulated environment in order to maintain the temperature for a prolonged time. This procedure would allow the rapid heating of multiple particle boards and provide post-heating conditions for a desirable degree of post-cure In view of the above, the overall post-curing period may be in the range of 5 minutes to 72 hours, such as 10 minutes to 48 hours, 15 minutes to 36 hours, 30 minutes to 30 hours, 45 minutes to 24 hours, or 1 hours to 18 hours The overall post-curing may be at least 5 minutes and/or less than 2 hours, or less than 1 hour.

According to a further embodiment of the process as defined above, in step (d), the sheet obtained in step (c) is heated, e.g. in a hot press, with temperatures set in the range of 140° C. to 270° C. to obtain a cured particle-board. Further examples of typical temperatures to be applied in step (d) for preparing the particle board include temperatures set in the range of 150 to 250° C., 160 to 240° C. and 180 to 220° C.

According to another embodiment, in step (d) of the process of the present invention, the sheet obtained in step (c) is pressed, e.g. in a hot press, at a pressure in the range of 20 to 80 bar to obtain a cured particle board. Generally, the pressure to be applied during step (d) depends on various factors, such as type of wood and binder composition, thickness and density of the particle board, temperature, etc. In further examples, the pressure may be from 25 to 75 bar, 30 to 70 bar, or 35 to 65 bar.

According to a further embodiment, in step (d) of the above-defined process, the sheet obtained in step (c) is pressed at a press factor in the range of 2 seconds/mm to 60 seconds/mm to obtain a cured particle board. Thus, the press-time will depend on the thickness of the particle board, and may be, according to further examples of the present invention, in the range of 3 seconds/mm to 40 seconds/mm, 4 seconds/mm to 30 seconds/mm, or 5 seconds/mm to 20 seconds/mm.

The process according to the present invention may further comprise, between step (c) and step (d), a step (c') of cold-compressing the sheet obtained in step (c).

In the following, further aspects of the present invention are described. However, it should be understood that all definitions provided above in relation to the process of the present invention also apply to the following aspects, if not stated otherwise.

Another aspect of the present invention relates to a wood board, notably a particle board, obtainable by the process as defined above.

In a further embodiment of the above-defined wood board, and particularly in respect of a particle board, swelling in the thickness-direction of the board as determined according to EN 317:1993 for an immersion time of 24 hours is 70% or below, preferably 60% or below and more preferably 50% or below.

Another aspect of the present invention relates to a particle board, characterized in that the swelling in the thickness-direction of the board as determined according to EN 317:1993 for an immersion time of 24 hours is 70% or below, preferably 60% or below and more preferably 50% or below.

In a preferred embodiment, the above-defined particle board shows swelling in the thickness-direction of the board as determined according to EN 317:1993 for an immersion time of 24 hours of 50% or below, 45% or below, 40% or below, 35% or below, or 30% or below. In even more preferred embodiments of the above-defined particle boards, swelling in the thickness-direction of the board as determined according to EN 317:1993 for an immersion time of 24 hours is 25% or below, 20% or below, 15% or below, 10% or below or even 5% or below.

The wood board may be plywood. In this case, the plywood preferably has a class 1 bonding quality, more preferably a class 2 bonding quality and most preferably a class 3 bonding quality according to the requirements of EN 314-2:1993 notably as tested according to EN 314-1:1993.

The wood board may be orientated strand board. Particularly in this case, the wood board may have:
- A bending strength—major axis of at least 14 N/mm$^2$, preferably at least 16 N/mm$^2$ and more preferably at least 18 N/mm$^2$, notably when measured according to EN 310:1993; and/or
- A bending strength—minor axis of at least 6 N/mm$^2$, preferably at least 7 N/mm$^2$ and more preferably at least 8 N/mm$^2$, notably when measured according to EN 310:1993; and/or
- A modulus of elasticity in bending—major axis of at least 2500 N/mm$^2$, preferably at least 3500 N/mm$^2$, notably when measured according to EN 310:1993; and/or
- A modulus of elasticity in bending—minor axis of at least 1200 N/mm$^2$, preferably at least 1400 N/mm$^2$, notably when measured according to EN 310:1993; and/or
- An internal bond of at least 0.26 N/mm$^2$, preferably at least 0.28 N/mm$^2$ and more preferably at least 0.29 N/mm$^2$, notably when measured according to EN 319:1993; and/or
- A swelling in thickness—24 h immersion of no more than 25%, preferably no more than 20% and more preferably no more than 15%, notably when measured according to EN 317:1993.

The wood board may be dry process board (MDF) or fibreboard. Particularly in this case, the wood board may have:
- A bending strength of at least 14 N/mm$^2$, preferably at least 17 N/mm$^2$ or 18 N/mm$^2$ and more preferably at least 20 N/mm$^2$, notably when measured according to EN 310:1993; and/or
- A modulus of elasticity in bending of at least 1400 N/mm$^2$, preferably at least 1700 N/mm$^2$ or 1900 N/mm$^2$, more preferably at least 2000 N/mm$^2$ notably when measured according to EN 310:1993; and/or
- An internal bond of at least 0.45 N/mm$^2$, preferably at least 0.5 or 0.55 N/mm$^2$ and more preferably at least 0.6 N/mm$^2$, notably when measured according to EN 319:1993; and/or
- A swelling in thickness—24 h of no more than 45%, preferably no more than 30% and more preferably no more than 20%, notably when measured according to EN 317:1993.

The wood board may be particle board. Particularly in this case, the wood board may have:
- A bending strength of at least 7 N/mm$^2$, preferably at least 8.5 N/mm$^2$ or 11 N/mm$^2$ and more preferably at least 13 N/mm$^2$ or 14 N/mm$^2$, notably when measured according to EN 310:1993; and/or
- A modulus of elasticity in bending of at least 105 N/mm$^2$, preferably at least 1200 N/mm$^2$ or 1500 N/mm$^2$, more preferably at least 1800 N/mm$^2$ or 1900 N/mm$^2$ notably when measured according to EN 310:1993; and/or
- An internal bond of at least 0.2 N/mm$^2$, preferably at least 0.25 N/mm$^2$ and more preferably at least 0.3 N/mm$^2$, notably when measured according to EN 319:1993; and/or
- A swelling in thickness—24 h immersion of no more than 23%, preferably no more than 19% and more preferably no more than 16%, notably when measured according to EN 317:1993.

The following documents are hereby incorporated herein by reference: EN 300:2006; EN 310:1993; EN 314-1:1993; EN 314-2:1993; EN 317:1993; EN 319:1993

The present invention provides a process for manufacturing wood boards, notably particle boards, which are characterized by only little swelling upon contact with moisture, as well as boards obtainable by such a process. According to the present invention, thermal post-curing of wood boards is combined with the use of carbohydrate binder systems, which are especially suitable for such post-curing processes. As mentioned before, the carbohydrate binder systems used in the process of the present invention are preferably chosen to be thermally stable under the required conditions, undergo further curing during heat treatment and compatible with heat degradation products of the wood. Moreover, the use of added formaldehyde is preferably avoided.

In the following, the present invention is further illustrated by providing examples, without being restricted thereto.

Example 1: Production of Particle Board (300 mm×300 mm×10 mm)

A carbohydrate binder composition was prepared by adding HMDA (10.53 g) to pre-react solution consisting of 32.44 g dextrose monohydrate (DMH; 90.9 wt.-% in H$_2$O), 29.59 g fructose (FRU; 100% solid), 10.53 g hexamethylene diamine (HMDA; 70 wt.-% in H$_2$O) and 22.32 g of water. This carbohydrate binder composition corresponds to 40:40:20 wt.-% DMH:FRU:HMDA.

The binder composition (105.3 g; 70 wt.-% in H$_2$O) and wood chips (526.5 g) were mixed and formed into a sheet, with a desired final density of 650 kg/m$^3$. This sheet was pressed with a heated press (Fontijne Lab Econ 600) at 195° C. and 56 bar (504 kN force) pressure. The press factor was 14 s/mm, corresponding to a total press time of 140 seconds.

Subsequently, similar results were achieved at a press factor of about 10 s/mm and less.

Example 2: Swelling Measurements

Swelling measurements were conducted according to EN 317:1993, if not specified otherwise.

In particular, a thermostatically controlled water bath, capable of maintaining a temperature of (20±1)° C. was used. Particle board samples with a side length of (50±1) mm were prepared and conditioned to constant mass in an atmosphere with a mean relative humidity of (65±5) % and a temperature of (20±2)° C. Constant mass was considered to be reached when the results of two successive weighing operations, carried out at an interval of 24 h, did not differ by more than 0.1% of the mass of the sample. Next, the thickness of each sample was measured to an accuracy of ±0.01 mm at the intersection of the diagonals and the samples were immersed with their faces vertical in clean, still water, having a pH of 7±1 and a temperature of (20±1)° C. This temperature was maintained throughout the test period, which was 2 hours or 24 hours, depending on the experiments. During the test, the samples were separated from each other and from the bottom and the sides of the water bath. The upper edges of the test pieces were covered by (25±5) mm of water throughout the test.

Finally, after the immersion time has elapsed, the samples were taken out of the water, excess water was removed and the thickness was measured of each sample in the same way as mentioned before.

Example 3: Post-Curing of Particle Board (Weight Loss/Swelling Reduction)

Particle boards obtained according to Example 1 were subjected to post-curing in an oven at a temperature of 140°

C. for 24 hours. Subsequently, the particle board samples (50±1 mm×50±1 mm×10±1 mm) were reconditioned as per initial conditioning mentioned above and weight loss and swelling reduction were determined and plotted against each other. The results are shown in FIG. 1.

Example 4: Density Reduction Measurements After Post-Curing

Particle board samples were obtained according to Example 1, except that a press factor of 16 seconds/mm was used, and were subjected to post-curing in an oven at different temperatures for 16 hours.

Figure 2:
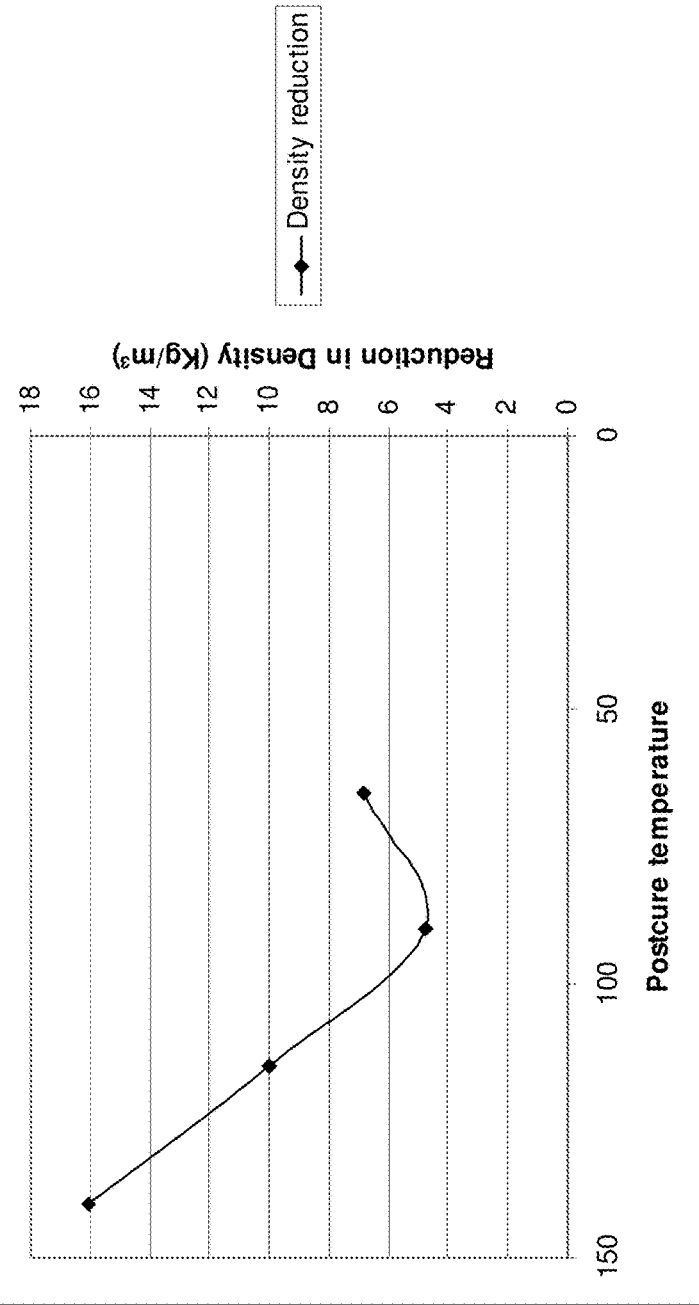
FIG. 2 shows the density reduction in board pieces when postcured at different temperatures for 16 hours. Binders were 40:40:20 DMH:FRU:HMDA, boards were pressed for 16 seconds/mm.

After post-curing and reconditioning, which was carried out as described above, the density was measured and compared to the initial density of the particle board samples. The results are plotted in FIG. 2, showing the reduction in density recorded comparing it before and after treatment.

Example 5: Thickness Measurements

Figure 3:
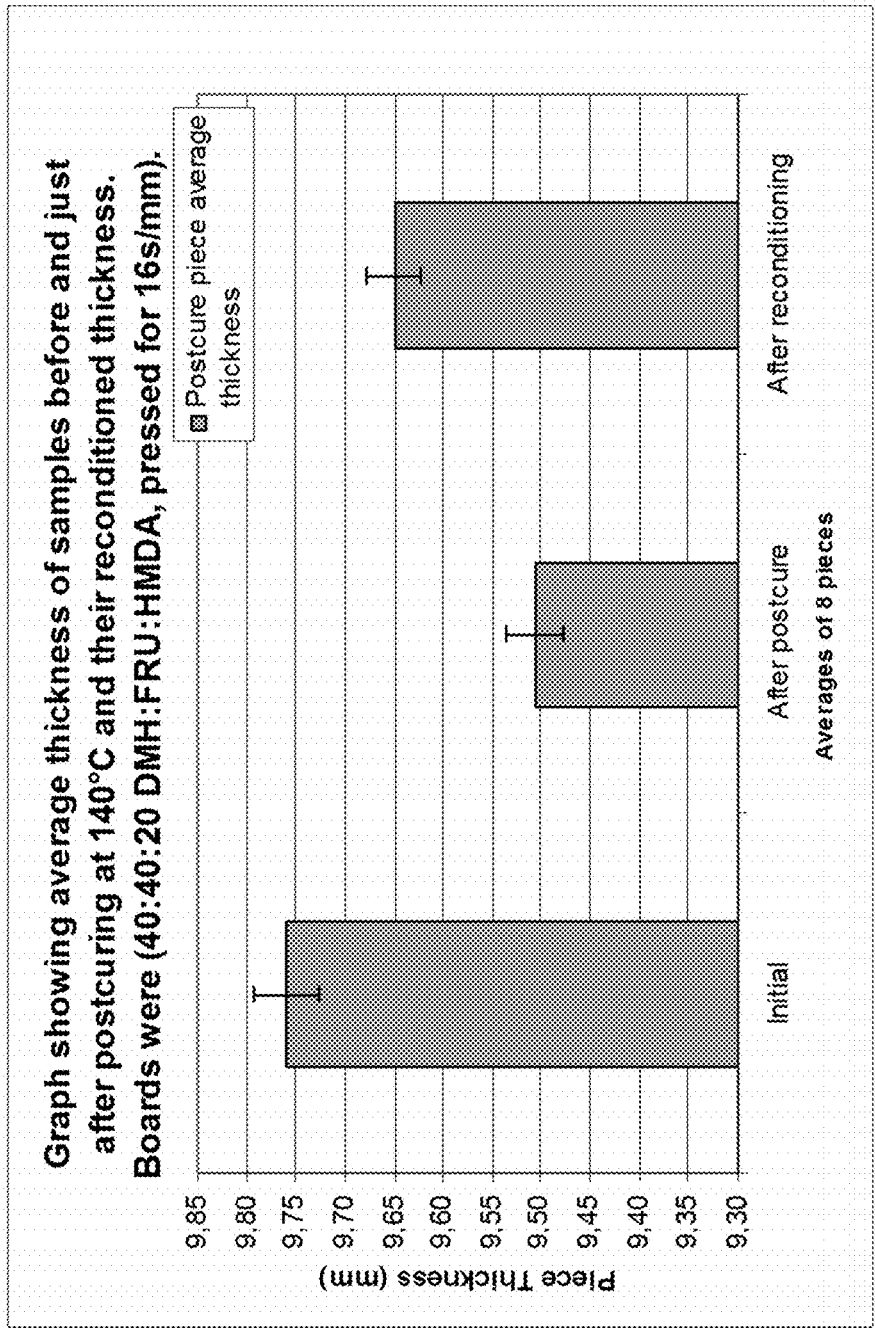
FIG. 3 shows the average thickness of samples before and just after postcuring at 140° C. and their reconditioned thickness. Binders were 40:40:20 DMH:FRU:HMDA, boards were pressed for 16 seconds/mm.

Particle board samples were obtained according to Example 1, except that a press factor of 16 seconds/mm was used. Then, the initial thickness of the particle board samples (50±1 mm×50±1 mm×10±1 mm) was determined and subsequently, thicknesses of said samples after post-curing in an oven at 140° C. and after reconditioning, which was performed as described above, were measured. The results are shown in FIG. 3.

Example 6: Swelling Improvement After Post-Curing (Temperature-Dependent)

Figure 4:
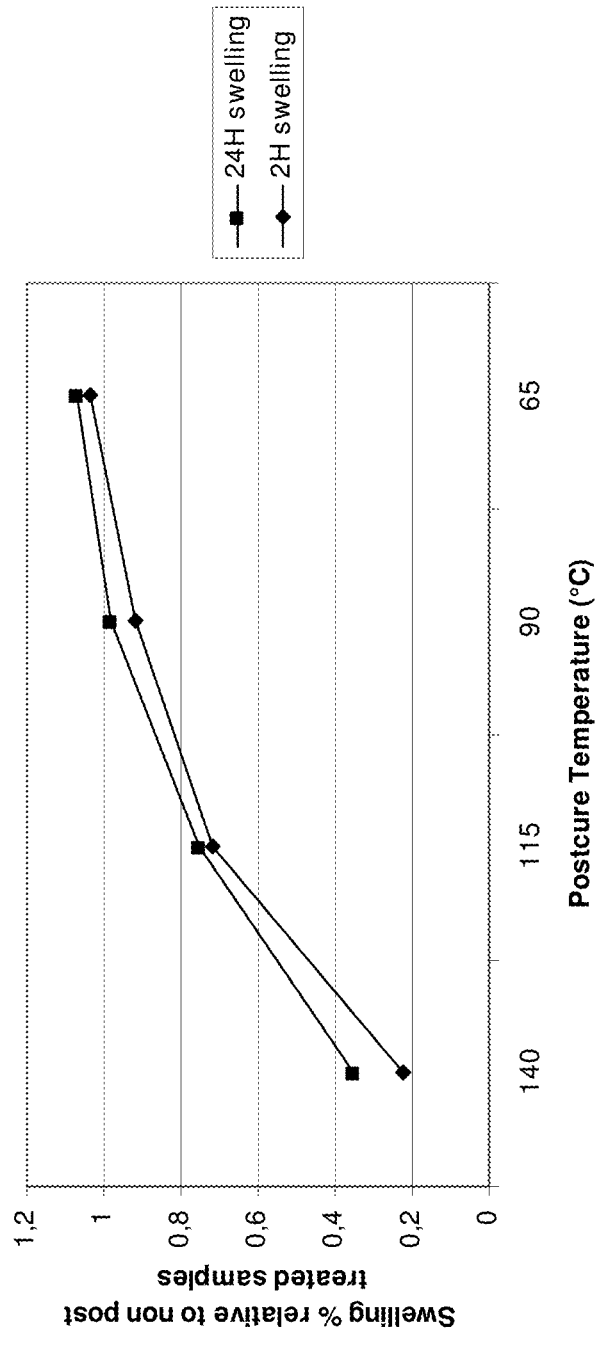
FIG. 4 shows the swelling reduction due to 16 hour post-curing at different temperatures. Binders were 40:40:20 DMH:FRU:HMDA, boards were pressed for 16 seconds/mm.

Particle board samples were obtained according to Example 1. Then, the particle board samples were subjected to post-curing in an oven at different temperatures (65° C., 90° C., 115° C. and 140° C.) for a duration for 16 hours. After said post-curing treatment, swelling was determined according to EN 317:1993 for immersion times of 2 and 24 hours, respectively. The results concerning swelling reduction are given in FIG. 4.

Example 7: Swelling Improvement After Post-Curing (Time-Dependent)

Figure 5:
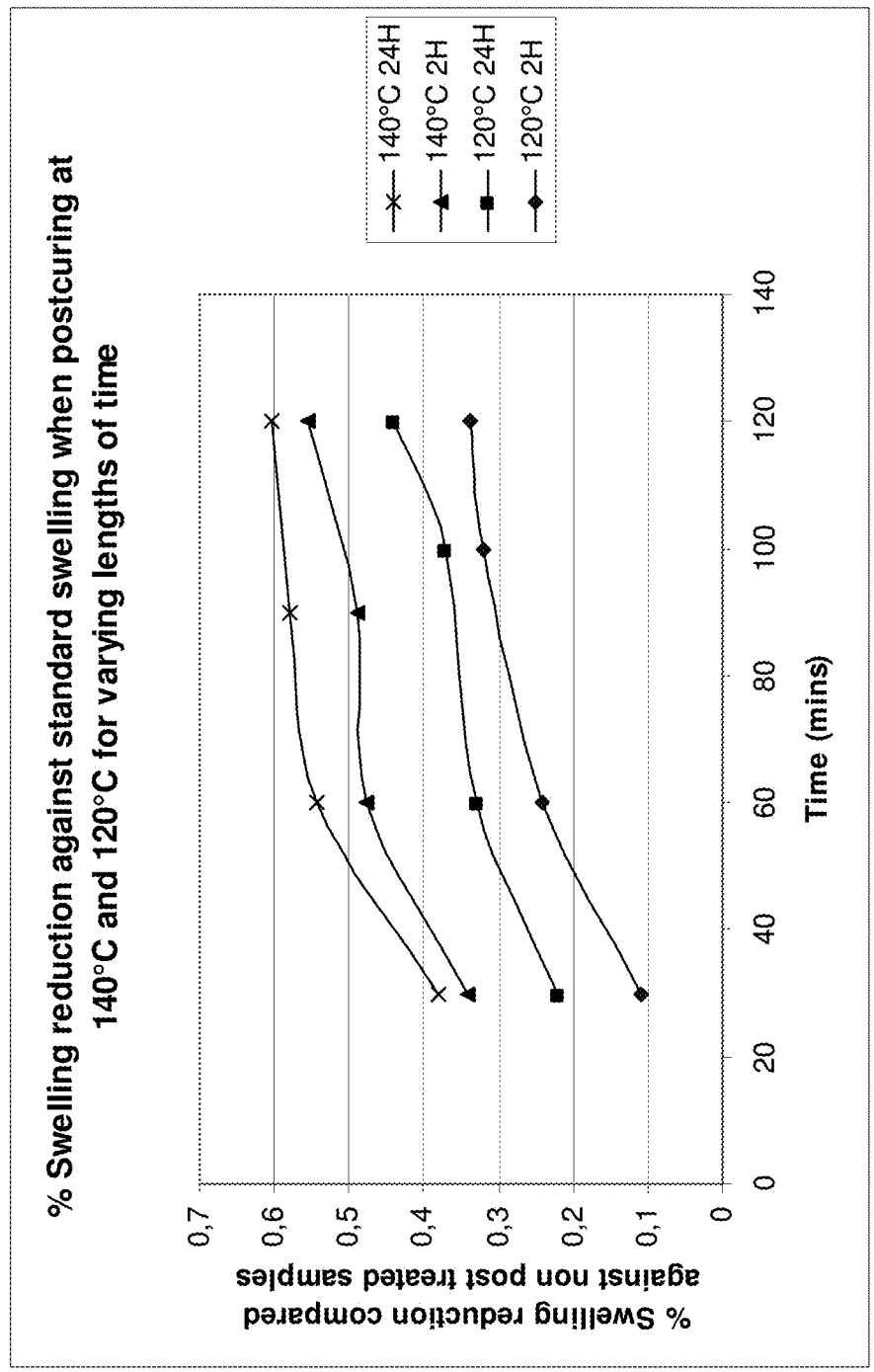
FIG. 5 shows the swelling reduction against standard swelling in percent when post-curing at 140° C. and 120° C. for varying lengths of time.

Particle board samples were obtained according to Example 1. Then, the particle board samples were subjected to post-curing in an oven at temperatures of 120° C. and 140° C. for different duration (30 min., 60 min., 90 min. and 120 min.). After said post-curing treatment, swelling was determined according to EN 317:1993 for immersion times of 2 and 24 hours, respectively. The results concerning swelling are given in FIG. 5.

Example 8: Post-Curing by RF Wave Irradiation

Particle board samples were obtained according to Example 1. Individual sample sizes were 100±1 mm×100±1 mm×10±1 mm. RF wave power was varied over the range from 200-800 W. This equates roughly with 20-80 kW/m$^2$ for the sample size used. Some incidences of flaring were observed at the higher power levels which, essentially is the formation of a plasma which induces burning on the surface of the sample. Reduction of the power level prevented flaring but still allowed relatively rapid heating. At a power level of 500 W, a temperature of 140° C. was reached in about 60 seconds and 160° C. in about 80 seconds. At a power level of 400 W, 140° C. was reached in about 80 seconds and 160° C. in about 100 seconds. Temperatures in excess of 180° C. were reached but timings were not recorded due to difficulties with flaring and the need to reduce power input.

Figure 6:
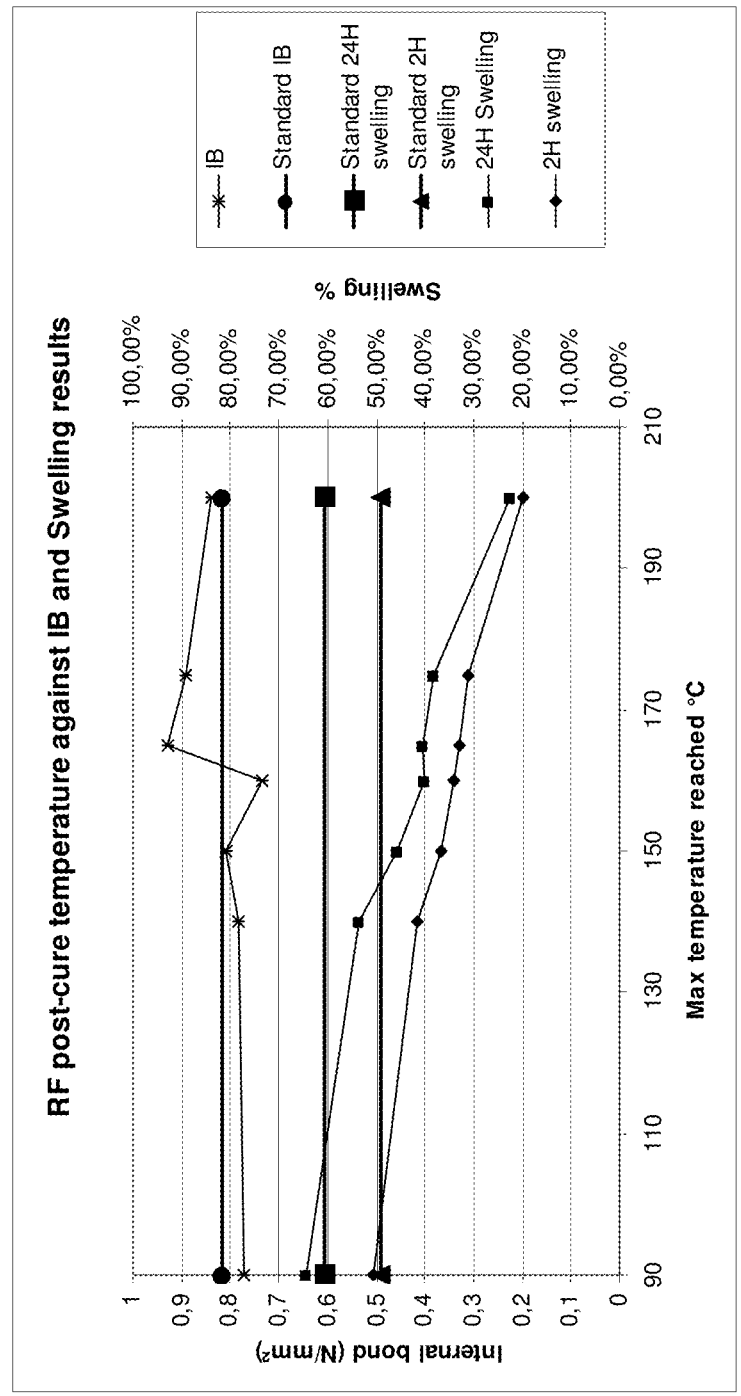
FIG. 6 shows RF wave post-cure temperature against internal bond strength (IB) and swelling results.

After said post-curing treatment, swelling was determined according to EN 317:1993 for immersion times of 2 and 24 hours, respectively. In addition internal bond strength was measured according to BS EN 319:1993. The resulting data is shown in FIG. 6.

Example 9: Influence of Microwave Post-Curing on Weight Loss/Swelling

Figure 7:
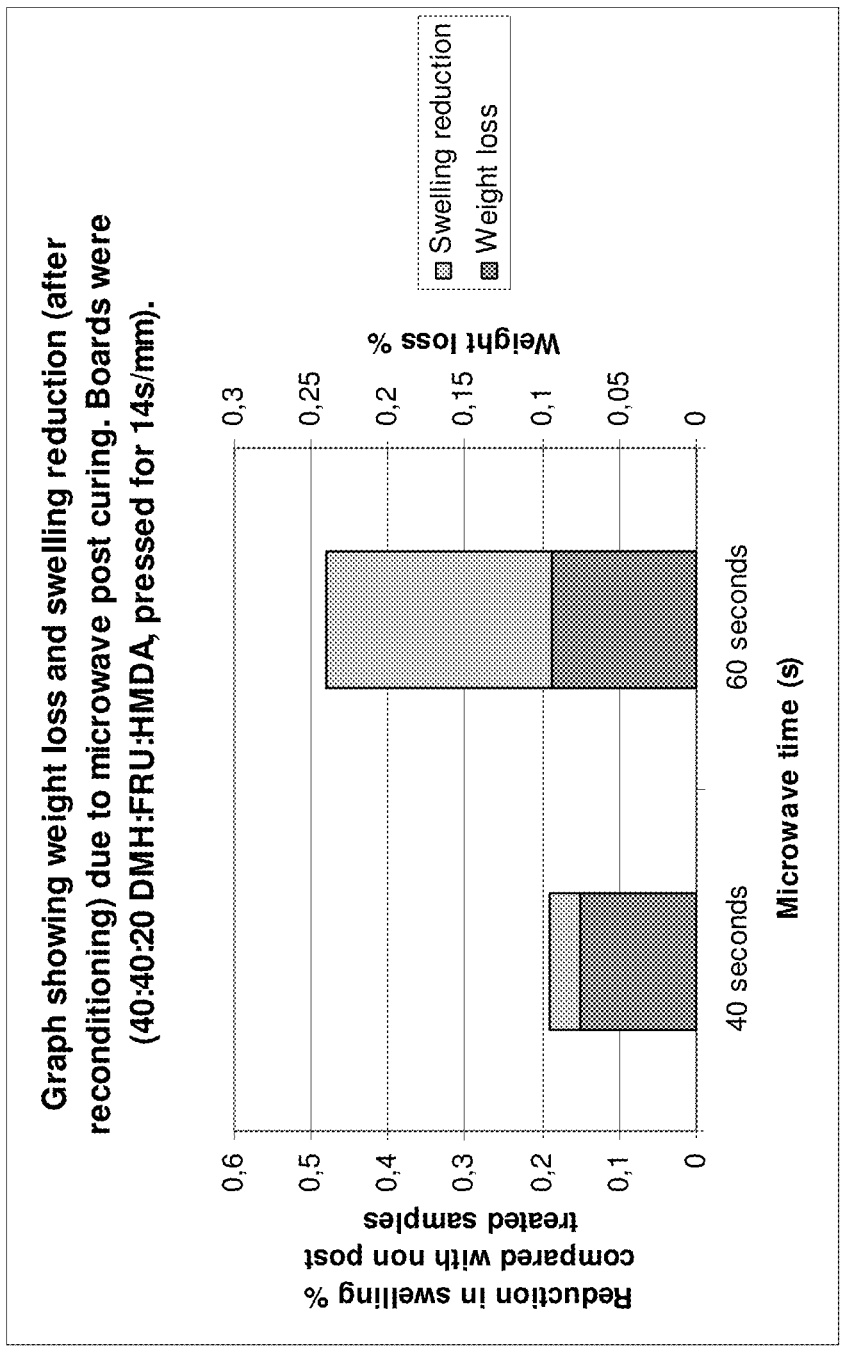
FIG. 7 shows weight loss and swelling reduction due to microwave post-curing. Binders were 40:40:20 DMH:FRU:HMDA, boards were pressed for 14 seconds/mm.

Particle board samples were obtained according to Example 1 and post-cured in a standard household microwave (700 W) at full power for 40 and 60 seconds, respectively. Sample sizes were 50±1 mm×50±1 mm×10±1 mm. Subsequently, weight loss and swelling (measured according to EN 317:1993, immersion time 24 hours) was determined regarding an original (i.e. non-post-cured) particle board sample and samples having been post-cured for 40 and 60 seconds, respectively. The resulting data is shown in FIG. 7.

The invention claimed is:
1. A process for manufacturing wood board, comprising:
 (a) providing wood pieces;
 (b) applying a carbohydrate binder composition to the wood pieces provided in (a);
 (c) forming the wood pieces obtained in (b) into a sheet;
 (d) heating and pressing the sheet obtained in (c) to obtain a cured wood board; and
 (e) post-curing the wood board obtained in (d)
 wherein the carbohydrate binder composition applied to the wood pieces is selected from the group consisting of a) a binder composition which comprises at least 50% by dry weight reducing sugar(s), b) a binder composition which comprises at least 50% by dry weight water-soluble reaction product(s) of reducing sugar(s) and Maillard reaction amine component(s) and c) a binder composition which comprises at least 50% by dry weight of the combination of i) any unreacted sugar(s), ii) any unreacted Maillard reaction amine component(s) and iii) water-soluble reaction product(s) of reducing sugar(s) and Maillard reaction amine component(s).

2. A process according to claim 1 for manufacturing particle board, comprising:
 (a) providing wood particles;
 (b) mixing the wood particles provided in (a) with a carbohydrate binder composition;
 (c) forming the mixture obtained in (b) into a sheet;
 (d) heating and pressing the sheet obtained in (c) to obtain a cured particle board; and
 (e) post-curing the particle board obtained in (d).

3. The process according to claim 1, wherein the post-curing in (e) is carried out at a temperature in the range of 75° C. to 280° C.

4. The process according to claim 1, wherein the post-curing (e) is carried out using radio frequency (RF) waves.

5. The process according to claim 1, wherein the post-curing (e) is carried out using a heated press, a conventional oven, hot steam and/or microwaves.

6. The process according to claim 1, wherein heating in the post-curing in (e) is carried out for a duration of 10 seconds to 30 hours.

7. The process according to claim 1, wherein the binder composition comprises at least one reducing sugar reaction product.

8. The process according to claim 1, wherein the binder composition comprises at least one reducing sugar and at least one Maillard reaction amine component.

9. The process according to claim 8, wherein
the at least one reducing sugar is selected from the group consisting of ribose, arabinose, xylose, lyxose, dextrose, mannose, galactose, allose, altrose, talose, gulose, idose, fructose, psicose, sorbose, dihydroxyacetone and tagatose, as well as mixtures thereof, and
the at least one Maillard reaction amine component is selected from the group consisting of ammonium sulfate ($AmSO_4$), ammonium chloride, ammonium nitrate, 1,2-diaminoethane, 1,4-diaminobutane, 1,5-diaminopentane, 1,6-diaminohexane, 1,12-diaminododecane, 1,4-diaminocyclohexane, 1,4-diaminobenzene, diethylenetriamine, triethylenetetramine, tetraethylenepentamine, 1-piperazine-ethanamine, 2-methyl-pentamethylenediamine, 1,3-pentanediamine, and bis(hexamethylene)-triamine, 1,8-diaminooctane, as well as mixtures thereof.

10. The process according to claim 8, wherein the binder composition comprises 50 to 90 wt.-% of total reducing sugar and 10 to 50 wt.-% of total Maillard reaction amine component, based on the total content of reducing sugar and Maillard reaction amine components.

11. The process according to claim 8, wherein the binder composition comprises 25 to 50 wt.-% of DMH, 25 to 50 wt.-% of fructose and 10 to 50 wt.-% of HMDA, based on the total content of reducing sugar and Maillard reaction amine components.

12. The process according to claim 1, wherein, in (d), the sheet obtained in (c) is heated with temperatures set in the range of 140° C. to 270° C. to obtain a cured wood board.

13. The process according to claim 1, wherein, in (d), the sheet obtained in (c) is pressed at a pressure in the range of 20 to 80 bar to obtain a cured wood board.

14. The process according to claim 1, wherein, in (d), the sheet obtained in (c) is pressed at a press factor in the range of 2 seconds/mm to 60 seconds/mm to obtain a cured wood board.

15. The process according to claim 1, wherein the process comprises the arrangement of a plurality of cured wood boards obtained from (d) to form a stack of wood boards and subjecting the stack of wood board to the post-curing (e).

16. The process according to claim 1, wherein, during the post curing of the wood board (e), the internal temperature of the wood board at the centre of the wood board in its thickness direction is raised to a temperature of at least 110° C. from a temperature at the end of the heating and pressing of the board (d) which is lower than the temperature attained during the post-curing by at least 5° C.

17. A wood board obtained or obtainable by the process as defined in claim 1.

18. The wood board or particle board according to claim 17, wherein swelling in the thickness-direction of the board as determined according to EN 317:1993 for an immersion time of 24 hours is 70% or below.

19. A method of reducing swelling in the thickness direction of a wood board when subjected to a swelling test comprising immersion in water, comprising manufacturing the wood board in accordance with claim 1.

20. The process according to claim 1, wherein, during the post curing of the wood board (e), the internal temperature of the wood board at the centre of the wood board in its thickness direction is raised to a temperature of at least 110° C. from a temperature at the end of the heating and pressing of the board (d) which is lower than the temperature attained during the post-curing by at least 10° C.

21. The process according to claim 1, wherein the wood board has a swelling in the thickness-direction as determined according to EN 317:1993 for an immersion time of 24 hours which is 70% or below.

22. The process according to claim 1, wherein the wood board is selected from the group consisting of plywood, oriented strand board, dry process board, MDF, or fibreboard.

23. The process according to claim 1, wherein the reducing sugar is obtained by conversion in situ from sucrose.

24. The process according to claim 1, wherein the binder composition applied to the wood pieces comprises at least 60% by dry weight reducing sugar(s).

25. A process for manufacturing wood particle board, comprising:
(a) providing wood particles;
(b) mixing the wood particles provided in (a) with a carbohydrate binder composition comprising at least 50% by dry weight reducing sugars;
(c) forming the mixture obtained in (b) into a sheet;
(d) heating and pressing the sheet obtained in (c) to obtain a cured particle board; and
(e) post-curing the particle board obtained in (d)
so that the particle board has the following properties:
a thickness of the wood board is in the range of 10 to 45 mm, and
a bending strength of at least 7 $N/mm^2$, and
a modulus of elasticity in bending of at least 1200 $N/mm^2$, and
an internal bond strength of at least 0.2 $N/mm^2$.

26. A process for manufacturing wood particle board, comprising:
(a) providing wood particles;
(b) mixing the wood particles provided in (a) with a carbohydrate binder composition consisting essentially of reactions product(s) of (i) at least one reducing sugar, and (ii) at least one Maillard reaction amine component;
(c) forming the mixture obtained in (b) into a sheet;
(d) heating and pressing the sheet obtained in (c) to obtain a cured particle board; and
(e) post-curing the particle board obtained in (d)
so that the particle board has the following properties:
a thickness of the wood board is in the range of 10 to 45 mm, and
a bending strength of at least 7 $N/mm^2$, and
a modulus of elasticity in bending of at least 1200 $N/mm^2$, and
an internal bond strength of at least 0.2 $N/mm^2$.

* * * * *